US008713256B2

(12) United States Patent
Sodhi et al.

(10) Patent No.: US 8,713,256 B2
(45) Date of Patent: Apr. 29, 2014

(54) METHOD, APPARATUS, AND SYSTEM FOR ENERGY EFFICIENCY AND ENERGY CONSERVATION INCLUDING DYNAMIC CACHE SIZING AND CACHE OPERATING VOLTAGE MANAGEMENT FOR OPTIMAL POWER PERFORMANCE

(75) Inventors: Inder M. Sodhi, Folsom, CA (US); Satish K. Damaraju, El Dorado Hills, CA (US); Sanjeev S. Jahagirdar, Folsom, CA (US); Ryan D. Wells, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 165 days.

(21) Appl. No.: 13/336,977

(22) Filed: Dec. 23, 2011

(65) Prior Publication Data

US 2012/0159074 A1 Jun. 21, 2012

(51) Int. Cl.
*G06F 12/00* (2006.01)
(52) U.S. Cl.
USPC ............................ 711/122; 711/118; 711/170
(58) Field of Classification Search
None
See application file for complete search history.

(56) References Cited

U.S. PATENT DOCUMENTS

| 5,831,849 | A  | * | 11/1998 | Matsui .............................. 700/3 |
| 6,043,559 | A  | * | 3/2000  | Banerjee et al. ............... 257/700 |
| 7,664,970 | B2 |   | 2/2010  | Jahagirdar et al. |
| 7,880,284 | B2 |   | 2/2011  | Zelikson et al. |
| 7,917,787 | B2 |   | 3/2011  | Jahagirdar et al. |
| 7,953,993 | B2 |   | 5/2011  | Allarey et al. |
| 2012/0173821 | A1 | * | 7/2012 | Levenstein et al. ........... 711/125 |

* cited by examiner

*Primary Examiner* — Shawn X Gu
(74) *Attorney, Agent, or Firm* — Blakely, Sokoloff, Taylor & Zafman LLP

(57) ABSTRACT

Embodiments described herein vary an amount of cache available for use by a processor, and an amount of power supplied to the cache and to the processor, based on the amount of cache actually being used by the processor to process data. For example, a power control unit (PCU) may monitor a last level cache (LLC) to identify if the size or amount of the cache being used by a processor to process data and to determine heuristics based on that amount. Based on the monitored amount of cache being used and the heuristics, the PCU causes a corresponding decrease or increase in an amount of the cache available for use by the processor, and a corresponding decrease or increase in an amount of power supplied to the cache and to the processor.

19 Claims, 14 Drawing Sheets

FIG. 6
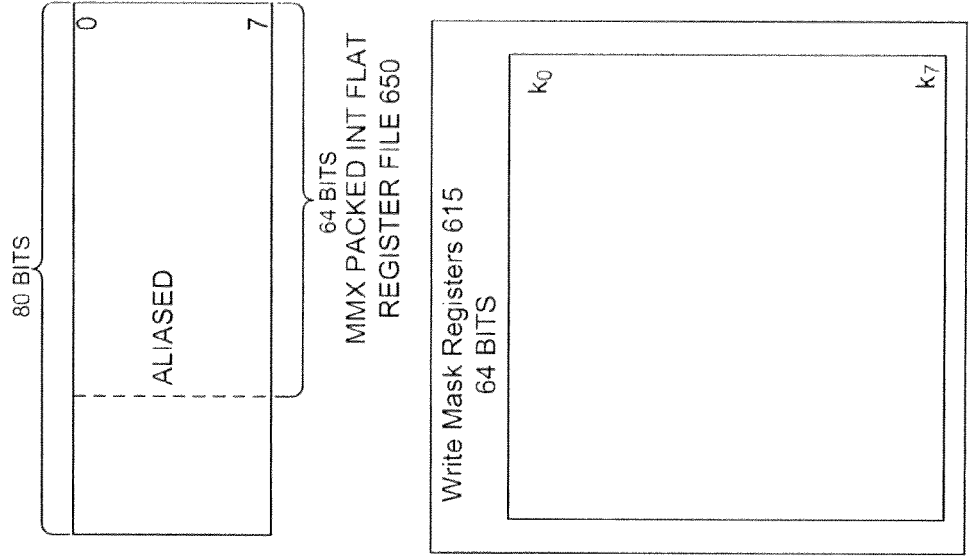
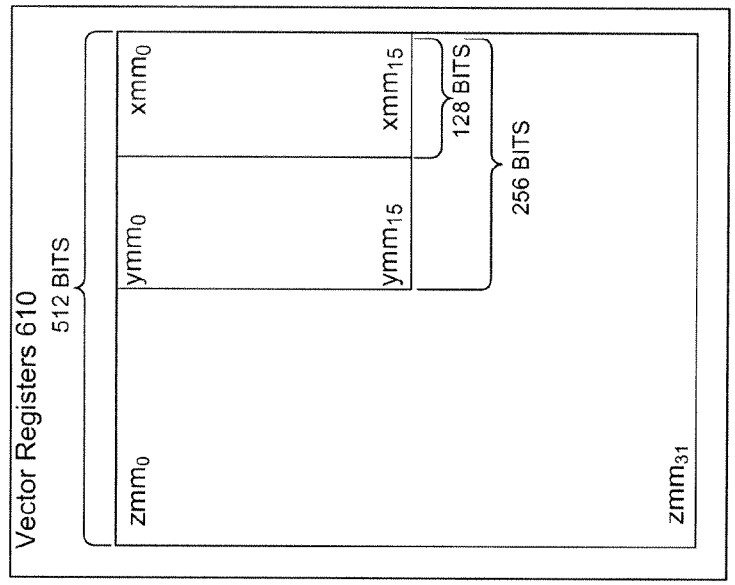
REGISTER ARCHITECTURE 600
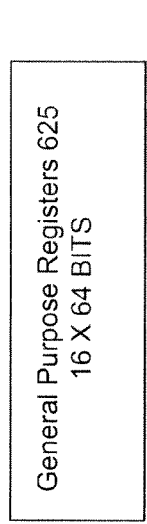

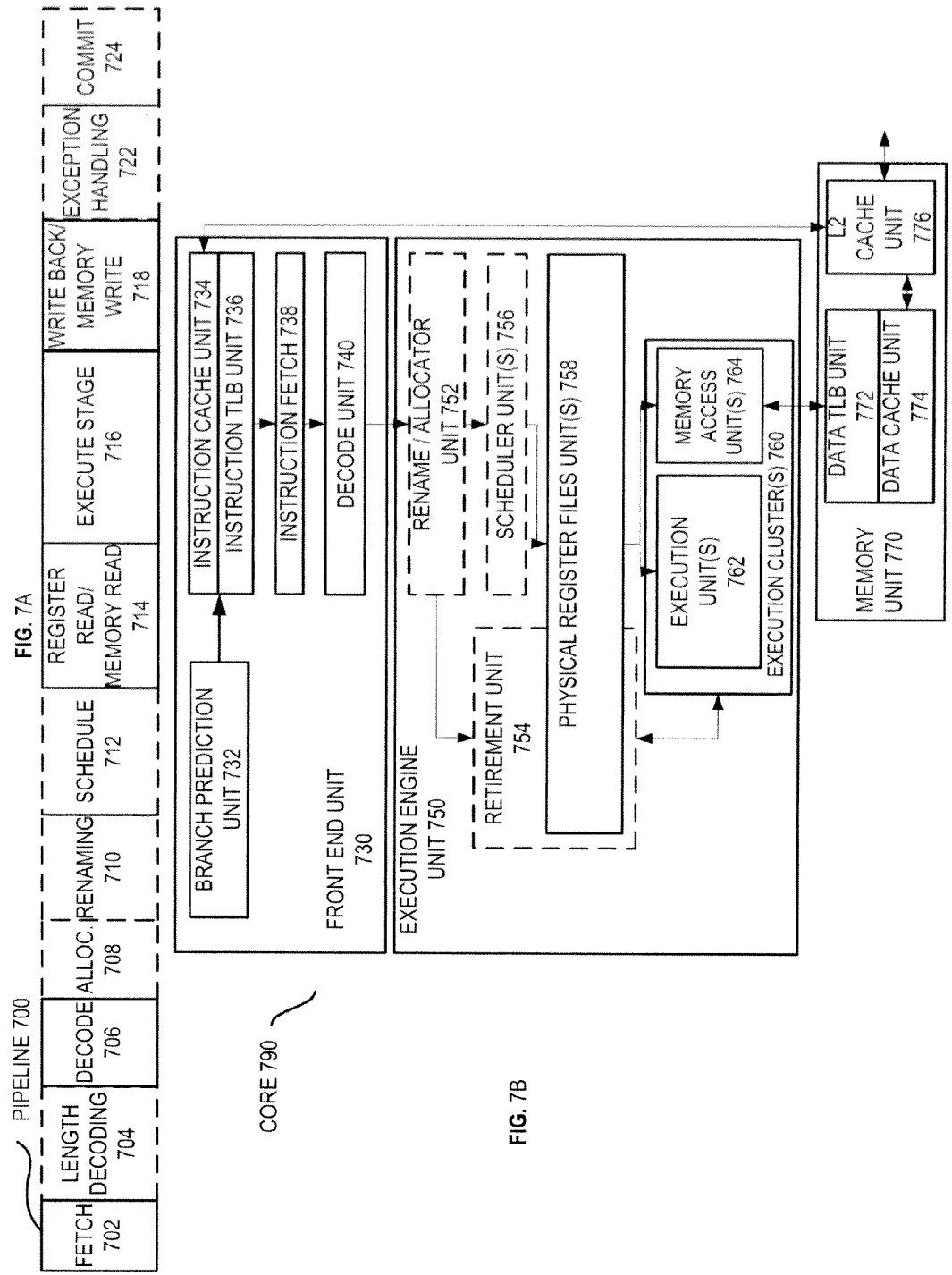

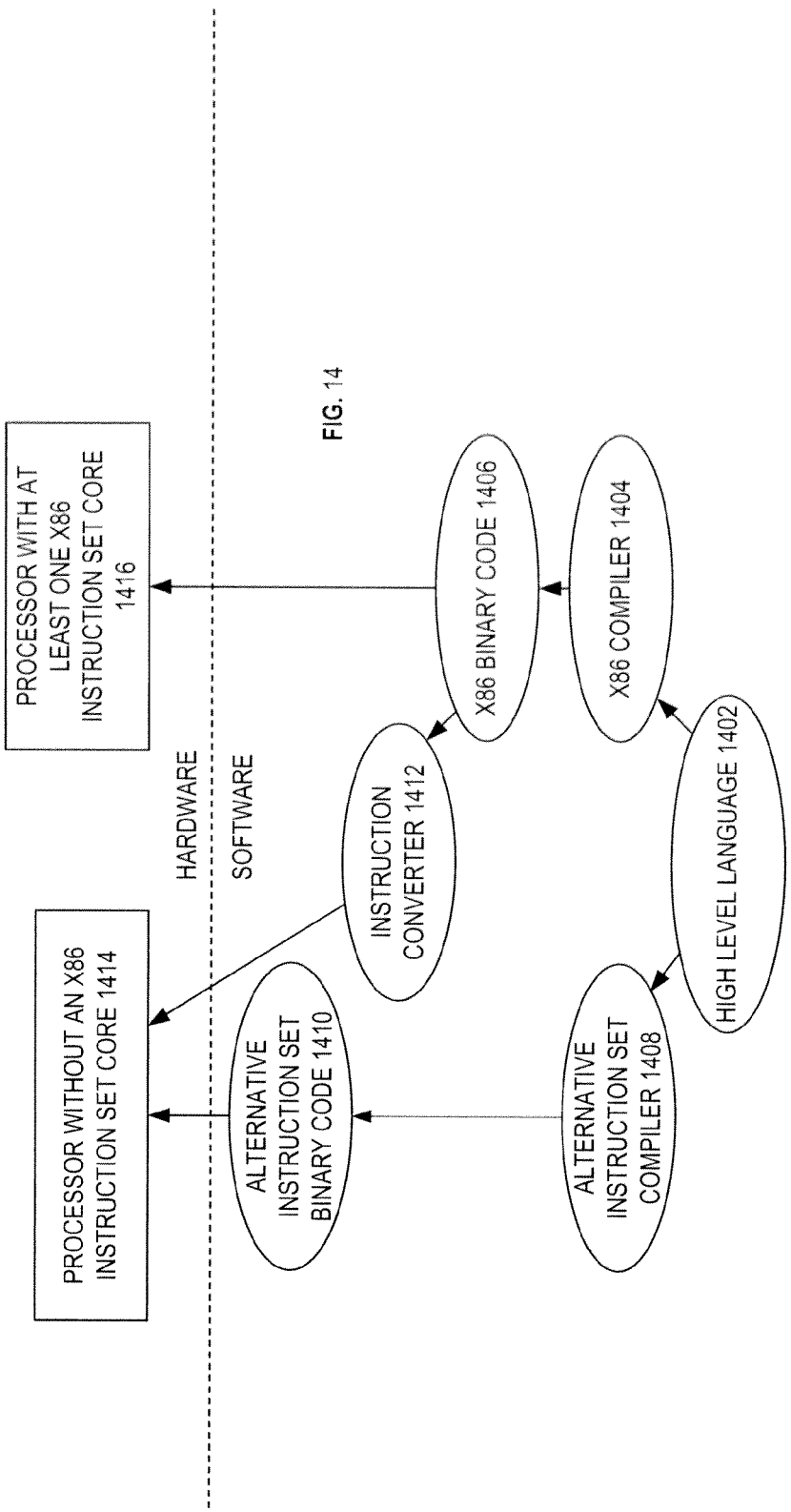

METHOD, APPARATUS, AND SYSTEM FOR ENERGY EFFICIENCY AND ENERGY CONSERVATION INCLUDING DYNAMIC CACHE SIZING AND CACHE OPERATING VOLTAGE MANAGEMENT FOR OPTIMAL POWER PERFORMANCE

FIELD

This disclosure pertains to energy efficiency and energy conservation in integrated circuits, as well as code to execute thereon, and in particular but not exclusively, to the field of dynamic cache sizing and cache operating voltage management for optimal power performance of computing device processors. More particularly, embodiments of the invention relate to energy efficient and energy conserving by reducing and increasing an amount of last level cache available for use by a processor, and an amount of power supplied to the cache and to the processor, based on the amount of cache actually being used by the processor to process data.

BACKGROUND

Advances in semi-conductor processing and logic design have permitted an increase in the amount of logic that may be present on integrated circuit devices. As a result, computer system configurations have evolved from a single or multiple integrated circuits in a system to multiple hardware threads, multiple cores, multiple devices, and/or complete systems on individual integrated circuits. Additionally, as the density of integrated circuits has grown, the power requirements for computing systems (from embedded systems to servers) have also escalated. Furthermore, software inefficiencies, and its requirements of hardware, have also caused an increase in computing device energy consumption. In fact, some studies indicate that computing devices consume a sizeable percentage of the entire electricity supply for a country, such as the United States of America. As a result, there is a vital need for energy efficiency and conservation associated with integrated circuits. These needs will increase as servers, desktop computers, notebooks, ultrabooks, tablets, mobile phones, processors, embedded systems, etc. become even more prevalent (from inclusion in the typical computer, automobiles, and televisions to biotechnology).

As the trend toward advanced microprocessors, e.g. central processing units (CPUs) or "processors", with more transistors and higher frequencies continues to grow, computer designers and manufacturers are often faced with corresponding increases in power and energy consumption. Particularly in computing devices, processor power consumption can lead to overheating, which may negatively affect performance, waste energy, damage the environment, and can significantly reduce battery life. In addition, because batteries typically have a limited capacity, running the processor of a mobile device more than necessary could drain the capacity more quickly than desired. Moreover, processor power consumption can be more efficiently controlled to increase energy efficiency and conservation associated with integrated circuits (e.g., the processor).

Thus, power consumption continues to be an important issue for computing devices including desktop computers, servers, laptop computers, wireless handsets, cell phones, tablet computers, personal digital assistants, etc.

BRIEF DESCRIPTION OF THE DRAWINGS

FIG. 6 is a block diagram of a register architecture according to one embodiment of the invention.

FIG. 7A is a block diagram illustrating both an exemplary in-order pipeline and an exemplary register renaming, out-of-order issue/execution pipeline according to embodiments of the invention.

FIG. 7B is a block diagram illustrating both an exemplary embodiment of an in-order architecture core and an exemplary register renaming, out-of-order issue/execution architecture core to be included in a processor according to embodiments of the invention.

FIG. 14 is a block diagram contrasting the use of a software instruction converter to convert binary instructions in a source instruction set to binary instructions in a target instruction set according to embodiments of the invention.

DETAILED DESCRIPTION

Figure 1:
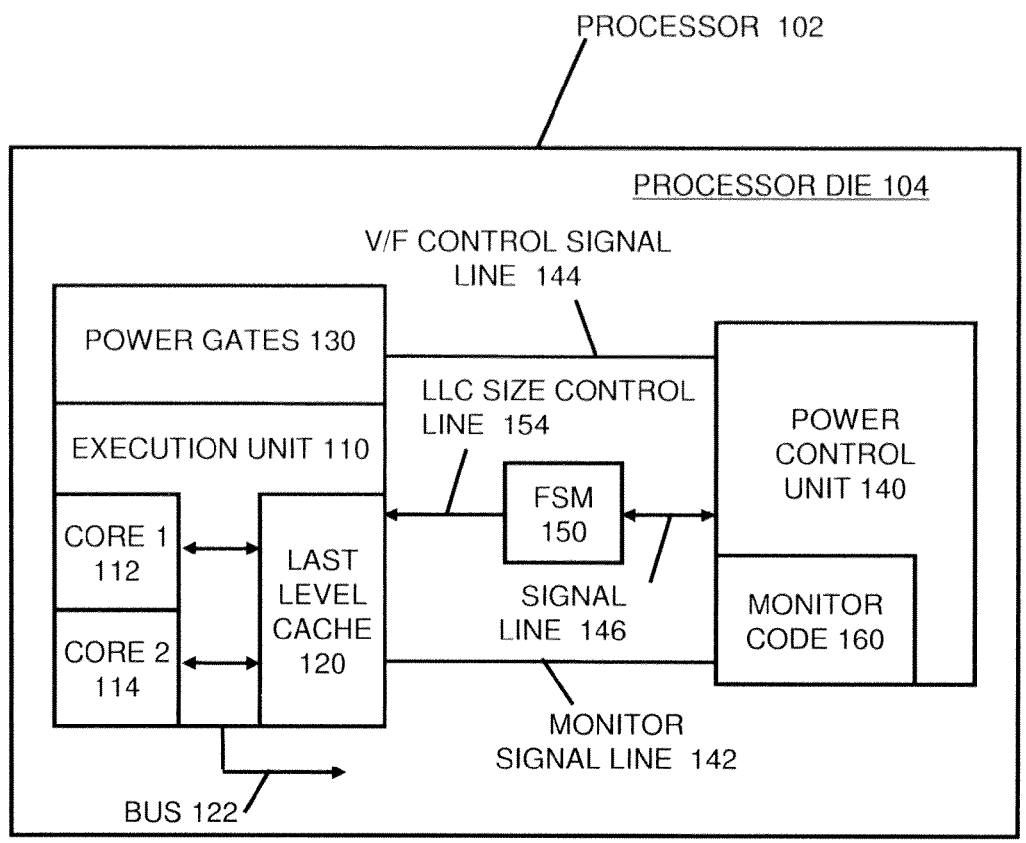
FIG. 1 is a block diagram of a processor that may be used to implement dynamic cache sizing and cache operating voltage management for optimal power performance, according to some embodiments of the present invention.

In the following description, the various embodiments of the invention will be described in detail. However, such details are included to facilitate understanding of the embodiments of the invention and to describe exemplary embodiments for employing the embodiments of the invention. Such details should not be used to limit the embodiments of the invention to the particular embodiments described because other variations and embodiments are possible while staying within the scope of the embodiments of the invention. Furthermore, although numerous details are set forth in order to provide a thorough understanding of the embodiments of the invention, it will be apparent to one skilled in the art that these specific details are not required in order to practice the embodiments of the invention.

In the following description, particular components, circuits, state diagrams, software modules, systems, timings, etc. are described for purposes of illustration. It will be appreciated, however, that other embodiments are applicable to other types of components, circuits, state diagrams, software modules, systems, and/or timings, for example.

Although the following embodiments are described with reference to energy conservation and energy efficiency in specific integrated circuits, such as in computing platforms or microprocessors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to desktop computer systems. And may be also used in other devices, such as handheld devices, systems on a chip (SOC), and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. Moreover, the apparatus', methods, and systems described herein are not limited to physical computing devices, but may also relate to software optimizations for energy conservation and efficiency. As will become readily apparent in the description below, the embodiments of methods, apparatus', and systems described herein (whether in reference to hardware, firmware, software, or a combination thereof) are vital to a 'green technology' future, such as for power conservation and energy efficiency in products that encompass a large portion of the US economy.

As the trend toward advanced microprocessors, e.g. central processing units (CPUs) or "processors", with more transistors and higher frequencies continues to grow, processor power consumption continues to be an important issue for computing devices including desktop computers, servers, laptop computers, wireless handsets, cell phones, tablet computers, personal digital assistants, etc. Moreover, for some processor designs, in order to achieve better performance, the processor cores and LLC (Last Level Cache) are on the same power plane (i.e., they share the same voltage and frequency points). However, certain applications (e.g., media playback applications) which use hardware acceleration do not utilize the LLC but still spend a considerable amount of time in active C-state (e.g., package C0; C-States and P-States are described further below). Other such applications may include processor sleep modes, operating system scheduling, DVD playing, Internet media streaming, and disc virus scans. In this mode, the processor is operating inefficiently because it is using a larger cache than needed and potentially higher operating voltage than needed. Moreover, the cache may be leaking a noticeable amount of power (e.g., due to being powered by the operating voltage needed to support the full size of the cache). In these cases, a cache shrinking "Dynamic Cache Shrink" (DCS) can be used to operate more efficiently. Such a DCS can be used for a single, dual or other processor configuration having a last level cache, to allow for operation of the processor in C0 state in a reduced cache size and voltage state in order to achieve optimal power and performance.

Embodiments of the invention include increased energy efficiency and conservation by reducing and increasing an amount of cache available for use by a processor (e.g., "dynamic cache sizing" or "dynamic cache shrink"), and an amount of power supplied to the cache and to the processor (e.g., "cache operating voltage management"), based on the amount of cache actually being used by the processor to process data. This may result in optimal power performance of computing device processors. For example, a power control unit (PCU) may monitor a last level cache (LLC) to identify if the size or amount of the cache being used by a processor to process data and to determine heuristics based on that amount. Based on the monitored amount of cache being used and the heuristics, the PCU causes a corresponding decrease or increase in an amount of the cache available for use by the processor (e.g., by controlling a finite state machine (FSM) which controls the amount of the cache available), and a corresponding decrease or increase in an amount of power supplied to the cache and to the processor. By matching the amount of the cache available and the amount of power supplied to the cache and to the processor with the amount of cache being used (e.g., the amount of the cache needed by the processor to process the data), energy efficiency and conservation are increased.

The "amount", "sizing" or a "size" of cache may describe a percentage, portion or other quantity of the total size of the cache. In some cases "amount" may cover a range of the size of the cache from zero size to the total or maximum size. Cache operating voltage "management" may include adapting, controlling, or adjusting the cache operating power, current or voltage, such as based on monitoring a characteristic of the cache, which may be or may include monitoring the cache size currently being used to process data (e.g., the cache size the processor, execution unit or cores are using to process data).

FIG. 1 is a block diagram of a processor that may be used to implement dynamic cache sizing and cache operating voltage management for optimal power performance, according to some embodiments of the present invention. FIG. 1 shows processor 102 including processor die 104, execution unit 110, thermal sensor 120, power gates 130, power control unit (PCU) 140, and finite state machine (FSM) 150. Gates 130 are coupled to PCU 140 by voltage and frequency (V/F) signal line 144. Execution unit 110 includes processor Core #0—112, processor core #1—114, and last level cache (LLC) 120. LLC 120 has output bus 122. PCU 140 includes monitor code 160 which is coupled to LLC 120 by monitor signal line 142. FSM is coupled to LLC 120 by LLC size control line 154. FSM is coupled to PCU 140 by signal line 146.

Execution unit 110 is configured to process data for an operating system running on or using unit 110 for processing. Execution unit 110 is also configured to process data for one or more applications (e.g., software applications) running on the operating system. Unit 110 may include hardware, circuitry, components and/or logic necessary for such processing. In addition, such processing may include using hardware, circuitry, components and/or logic in addition to unit 110.

Execution unit 110 includes processor Core #0—112, processor core #1—114, and last level cache (LLC) 120. These may all be used to execute instructions or perform processing. Cache 120 may be shared by the cores. Cores 112 and 114, and cache 120 may represent processor cores and last or lowest level cache as known.

For example, some embodiments of dynamic cache sizing and cache operating voltage management described herein are particularly suited for a processor 102 having multiple processor cores. In this example, core 112 (e.g. Core #0) and core 114 (e.g. Core #1), are a dual-core CPU. In the dual-core structure, the CPU cores 112 and 114 utilize (write to and read data from) shared cache 120. For example, this shared cache 120 may be a level 2 (L2) cache that is shared by the cores. Cache 120 may be a CMOS designed cache as known in the art. Thus, when cache 120 is powered by the operating voltage needed to support or make the maximum size of the cache available to the processor, cache 120 leaks a noticeable amount of power due to biasing of the CMOS transistors of the cache. In some cases, shared cache 120 may be a last level cache that is shared by the cores. However, it should be appreciated that any suitable number of CPU cores may be utilized. For example. Cores 112 and 114 may represent only a single processor core; or three, four, or more processor cores.

In some embodiments, each core 112 and 114 includes a core ID, microcode, a shared state, and a dedicated state. The microcode of the cores is utilized in performing the save/restore functions of the CPU state and for various data flows in the performance various processor states. It is considered that a separate and dedicated sleep state SRAM cache may be utilized to save the states of the cores, such as during sleep modes. Other hardware may also be used to store the states.

Power gates 130 are shown coupled to or as part of execution unit 110. These gates may be described as embedded power gates in the core (e.g., on die 104 with and attached directly to unit 110). In some cases, gates 130 include circuitry and voltage (e.g., ground planes, clock, and power planes) attached, formed, or mounted onto surfaces (e.g., a inside surfaces) of unit 110. These voltage planes may be common to or shared by cores 112 and 114. In some embodiments, these voltage planes may be common to or shared by core 112, core 114 and cache 120. Thus, core 112, core 114 and cache 120 may receive the same operating power (e.g., same operating voltage or available power) from gates 130. They may also receive the same operating clock frequency from gates 130 (e.g., for running the cores and LLC). This voltage and clock frequency may be variable and may be managed (e.g., controlled or varied) such as depending on processing needs, P-states, and other factors, such as is known. In some embodiments, they are also managed based on cache used and/or available, as described herein. This power may be considered to be supplied by a first power supply of gates 130. In some cases, the clock may also be part of the first power supply. In some cases, this power may be approximately 0 to 1.2 volts at 0 to 3.6 GHz. More typically, active operating power may be 0.7 to 1.2 volts at 1.2 to 3.6 GHz. However, it can be appreciated that this is just one example and that other values are considered.

The planes of gates 130 may be attached to power leads or contacts of unit 110. According to some embodiments, gates 130 are switch capacitor circuits that are used for power plane isolation (power gating) of digital circuits. They operate in normal (voltage=Vcc) mode; or they operate in high resistance (voltage=Vcc/10) mode, thereby reducing the leakage power of the unit under control (e.g., unit 110). Some descriptions herein of unit 110 consider that gates 130 are included in or as a part of the circuitry of unit 110. Embodiments are also contemplated where gates 130 are not included in or as a part of (e.g., are not part of) the circuitry of unit 110. It is also considered that gates 130 may exist external to die 104 (e.g., such as by being an off-die voltage regulator).

Power control unit 140 is coupled to unit 110 (e.g., gates 130) by V/F control signal line 144. Line 144 may represent one or more control signals (e.g., digital "C" and "P" processor state or mode command signals as noted below) sent to gates 130 using one or more signal lines.

Unite 110 has output bus 122. Output bus line 122 is for Execution Unit 110 to get data that misses the LLC and to evict data from LLC to memory. Bus 122 may be a Bus Interface Unit of the processor, such as to a RAM memory (e.g., DRAM). In some embodiments, bus 122 and the DRAM may be powered by a voltage plane and clock frequency that is not in common to or shared by unit 110 (e.g., is not the same operative voltage as that of core 112, core 114 and cache 120). Thus, bus 122 may receive a second and different operating power or voltage from gates 130. The second power may supply a fixed amount of power and frequency to the Bus Interface Unit. This power may be considered to be supplied by a second power supply of gates 130. In some cases, this power may be approximately 1.0 volts at 800 MHz. However, it can be appreciated that this is just one example and that other values are considered.

According to some embodiments, a "Dynamic Cache Shrink" (DCS) may include 3 components, monitor code 160 that looks at the conditions to enter DCS (i.e., when the cache size available to the processor can be shrunk—"ways reduced", thus allowing for operating power to the processor to also be reduced). A single "way" may be a fraction of the total cache size (e.g., such as 1/16), so reduced ways may reduce the size of the case available to the processor, allowing the operating power of the processor to also be reduced. For example, PCU 140 may reduce the execution unit operating voltage when in DCS mode (e.g., since the size of the cache has been reduced). Also, when more cache is being used or needed by the processor, expand logic (e.g., part of unit 140) may exit DCS mode (expand cache size available to the processor to "full ways", thus allowing for operating power to the processor to also be increased). This may include the processor entering a full cache operating point for maximum performance.

PCU 140 may include logic to reduce (or to cause to be reduced) the execution unit operating voltage when in DCS mode, and expand logic that exits DCS mode (expand cache size available to the processor to "full ways", thus allowing for operating power to the processor to also be increased) and enters full cache operating point for maximum performance.

In some embodiments, PCU 140 may include logic to reduce (or to cause to be reduced) the operating voltage when in DCS mode; and after reducing the cache from full ways to a reduced set (DCS ways), PCU 140 will reduce the operating voltage to the minimum required for the DCS ways reduced to operate.

FSM is coupled to PCU 140 by signal line 146. Line 146 may represent one or more control signals (e.g., digital FSM control command signals as noted below) sent to FSM 150 using one or more signal lines. FSM is coupled to LLC 120 by LLS size control line 154. Line 154 may represent one or more cache size control signals (e.g., as noted below) sent to LLC 120 using one or more signal lines.

Monitor code 160 may include logic to monitor or look at the conditions to enter DCS (i.e., when the cache size available to the processor can be shrunk—"ways reduced", thus allowing for operating power to the processor to also be reduced). Code 160, or unit 140 separately from code 160, may include expand logic that exits DCS mode (expand cache size available to the processor to "full ways", thus allowing for operating power to the processor to also be increased) and enters full cache operating point for maximum performance.

In some cases, monitor code 160 (or unit 140) may include logic to looks at the conditions to enter DCS based on smart heuristics that look at CPU operating point (P-state), amount of C0-time, cache hit/miss statistics, cache line replacement metrics etc., to figure out if its energy efficient to reduce the cache. These may be described as "smart cache expand heurestics." According to embodiments, monitor code 160 (or unit 140) may also include expand logic that exits DCS mode (expand to full ways) and enters full cache operating point for maximum performance. Monitor code may include logic that looks at CPU utilization (e.g., the percent of time the processor is in the C0 state) time operating system power management (OSPM) requests etc. to exit the reduced cache DCS mode. In some cases, OS Power Management requests may include SW (e.g., software) hooks to go from a "Balanced" power mode to "High Performance" mode, the high performance mode causing the FSM to expand to full LLC size immediately for highest performance.

In some cases, a "way" may represent ½ megabytes of cache size, cache amount, or cache memory storage size. For example an 8 MB LLC (e.g., maximum or total size of 16 MB) may have a maximum size of 16 ways. In this case, Dynamic sizing of the last level cache may include sizing (e.g., decreasing and increasing within a limit of) between 2 and 8 MB. In some cases, Dynamic sizing of the last level cache may include sizing between 25% and 100% of the cache maximum size.

Monitor code 160 of power control unit 140 is coupled to unit 110 by monitor signal line 142. In some cases line 142 (or code 160) may be described as having metrics (e.g., see block 220, 225 and 230) that PCU 140 can use to dynamically size cache and manage operating voltage. Such metrics may include LLC hit/miss count or ratio; LRU (e.g., least recently used) stats etc. for determining if the LLC is being used by the cores or not and if it is, then how much of the cache is being used by the processor to process data. These may be described as "smart cache expand heurestics."

Line 142 may represent one or more monitor signals used by code 160 to monitor cache 120. Line 142 may represent signals from cache 120 that indicate the amount of cache actually being used by the processor to process data. Line 142 may represent signals sent to or monitored by code 160 using one or more signal lines. The signal may be a periodic "tap" or "sniff" (e.g., by code 160) of an existing signal of cache 120, or may be a periodic output by monitor circuitry existing in cache 120. Such period between sniffs may be between 100 milliseconds and 1 second. In some cases the period (e.g., evaluation interval) may be 100, 200, 500 or 750 millisecond. Such Evaluation Intervals maybe used to add hysterisis to the control logic to increase the efficiency of the design (e.g., increase efficiency of the cache sizing and operating voltage management). Also, such a period of "sniffing" or the period or amount of time over which the cache may be monitored, may be 0.5, 1 or 2 milliseconds. In some cases the period may be 1 millisecond. In some cases, line 142 is a sensor output signal line that represents or estimates the amount of cache actually being used by the processor to process data by averaging an amount used over a period of time, such as over the "sniffing" or the period or amount of time noted above.

Monitor code 160 or power control unit 140 may be configured to monitor the cache 120 to identify a reduced or increased amount of cache being used by the processor to process data. Identifying a reduced or increased amount may include identifying an increase or decrease along a scale of the total or maximum amount of cache, such as to determine whether the amount of cache available to the processor should be changed by comparing the amount used to thresholds. It may also include calculating heuristics, metrics or factors based on the amount of cache being used. This may include comparing a monitored amount of cache used, heuristics, metrics and/or factors, to a number of threshold amounts along the scale of the total amount of cache size. Also, identifying a reduced or increased amount may include identifying an increase or decrease, heuristic, metric and/or factor relative to a prior amount of cache used, heuristic, metric and/or factor (e.g., from one or more prior amounts identified). This may include comparing a monitored amount of cache used, heuristic, metric and/or factor to an upper and a lower threshold amount as compared to the prior amount. In some cases, monitor 160 or unit 140 can detect that the amount of cache being used, heuristic, metric and/or factor has increased to greater than a first threshold (e.g., TH1) or has decreased to less than a second threshold (e.g., TH2), while the execution unit is performing processing of data in an active processor power state. According to embodiments, unit 140 may receive detected the amount of cache being used, or other information used to calculate heuristics, metrics and/or factors, based on monitor signal line 142, periodically sniffed by code 160.

According to some embodiments, the thresholds (e.g., first and second threshold) may be predetermined (e.g., predetermined during design of the processor) based on a design of the processor and execution unit. According to some embodiments, such design may take into consideration a type of device, processor, cores, LLC and optionally battery (e.g., certain manufacturer and model of mobile phone, desktop computer, laptop computer and chassis thereof) into which the processor and execution unit is to be installed. The thresholds may be predetermined to achieve optimal power and performance of unit 110 (e.g., the cores and LLC), and may provide increased energy efficiency and energy conservation. In some cases, the thresholds may be ½ megabytes of cache size, cache amount, or cache memory storage size. For example an 8 MB LLC (e.g., maximum or total size of 16 MB) may have a maximum size of 16 ways. In some cases they may be 10, 16, 20 or 24 divisions of the total cache size (e.g., granularity).

As will be further explained, in some cases, the choice of what size the cache is dynamically changed to (e.g., "sizing" of the LLC controlled by unit 140 and sized by FSM 150) may be based on: (1) the detected size of the cache currently being used by the processor (if 4 Mb used, then size to 4 Mb available); (2) metrics and heuristics considering (1); or (3) both (1) and (2). In some embodiments, only both (1) and (2) are used. In some cases (1) and (2) are used, as well as considering the size (e.g., amount of cache reduced to) that is needed to be at the next lower operating voltage. In any of the cases above, other factors may also be included in the choice, such as LLC hit rate, transaction inter arrival rate, and memory boundness (waiting for data back from memory/DRAM—e.g., the DRAM coupled to bus 122). These may be described as "smart cache expand heurestics." In some embodiments, any or all of these factors may be described as "metrics" or "heuristics".

In some cases, sizing based on (1) may include identifying that a certain amount of cache (say 4 MB) is being used by processor, and based on that amount, sizing the cache to provide the next division of cache size to be available to the processor (e.g., size to 4 or 4.5 MB available).

In some embodiments, the thresholds may be selected so that dynamic sizing of the case happens in increments of ½ megabytes of cache size, cache amount, or cache memory storage size. For example an 8 MB LLC (e.g., maximum or total size of 8 MB) may have a maximum size of 16 ways, or have 16 increments of dynamically sized cache amount to be provided to the processor. In some cases they may be 10, 16, 20 or 24 divisions of the total cache size.

Upon or based on received signal 142 (e.g., based on detecting or identifying the amount of cache being used), power control unit 140 may be configured to perform dynamic cache sizing and cache operating voltage management of cache 120 by sending control signals on lines 144 and 146.

Power control unit 140 may be configured to control or size the amount of cache available for use by the processor (e.g., by controlling FSM 150). This may include changing or managing an amount or size of cache 120 available to core 112, core 114, such as using signal 146. This may also include (e.g., unit 140 using line 146) causing FSM 150 to increase or reduce the amount of cache available for use by the processor (e.g., based on the increased or reduced amount of cache being used) such as using signal 154. Consequently, FSM 150 may be configured to reduce or increase the amount of cache available for use by the processor, based on signal 146 received from the power control unit, where signal 146 is based on the reduced or increased amount of cache being used.

Power control unit 140 may also be configured to control or manage the operating voltage of the processor (e.g., by controlling gates 130 directly). This may include managing a same operating voltage and frequency of core 112, core 114 and cache 120, such as using V/F control signal 144. In some embodiments, this may include (e.g., unit 140 using line 144) causing gates 130 to increase or reduce operating voltage of the processor (e.g., based on the increased or reduced amount of cache being used). Managing the operating voltage of the processor may include increasing or reducing operating voltage of the processor (e.g., based on the increased or reduced amount of cache being used) without changing the clock frequency of the processor.

In some cases, the PCU 140 increasing or reducing the operating voltage of the processor without changing the clock frequency, is based on the reduced amount or the increased amount of cache available for use by the processor (e.g., the cache size, as sized by FSM 150). This may or may not consider what is monitored as the amount of cache used by the processor. For instance, the operating voltage of the processor may be selected to be the minimum required for the increased or reduced amount of cache the FSM 150 has sized to be available for use by the processor (e.g., based on DCS ways).

This can be described as controlling the first power supply to provide a changeable operating power to the processor based on an amount of cache available for the processor to use so that less power is used by the processor (e.g., execution unit and cache), due to dynamically sizing the cache, even though the clock frequency remains the same for the processor. Here, operating voltage may be reduced while the cache is shrunk, thus allowing the ability to control operating voltage as a function of # of cache ways active, to save power. Thus, in some embodiments, since the core (or cores) can operate at a lower voltage (e.g., where the LLC size is the limiter for the voltage) the size and voltage can be reduced when possible, by providing and controlling (based on cache sizing) the same operating voltage to the cores and to the LLC.

Unit 140, code 160, and FSM 150 may include hardware logic and/or BIOS configured to perform such control. In some cases, they include hardware, hardware logic, memory, integrated circuitry, programmable gate arrays, controllers, buffers, flip-flops, registers, state machines, FPGAs, PLDs, active devices (e.g., transistors, etc.), passive devices (e.g., inductors, capacitors, resistors, etc.), and/or other circuit elements to perform energy efficient and power conserving dynamic cache sizing and cache operating voltage management of cache 120.

Execution unit 110, FSM 150, power gates 130 and power control unit 140 may be formed on or in processor die 104 as known in the art. In some cases, power gates 130 and FSM 150 may be described as coupled between execution unit 110 and power control unit 140. In some cases, processor die 104 is a single die or "chip". In other cases, processor die 104 represents two or more die or "chips". It will be appreciated that the systems described further below (e.g., see FIGS. 5-13) and/or other systems of various embodiments may include other components or elements not shown in FIG. 1 and/or not all of the elements shown in FIG. 1 may be present in systems of all embodiments.

Figure 2:
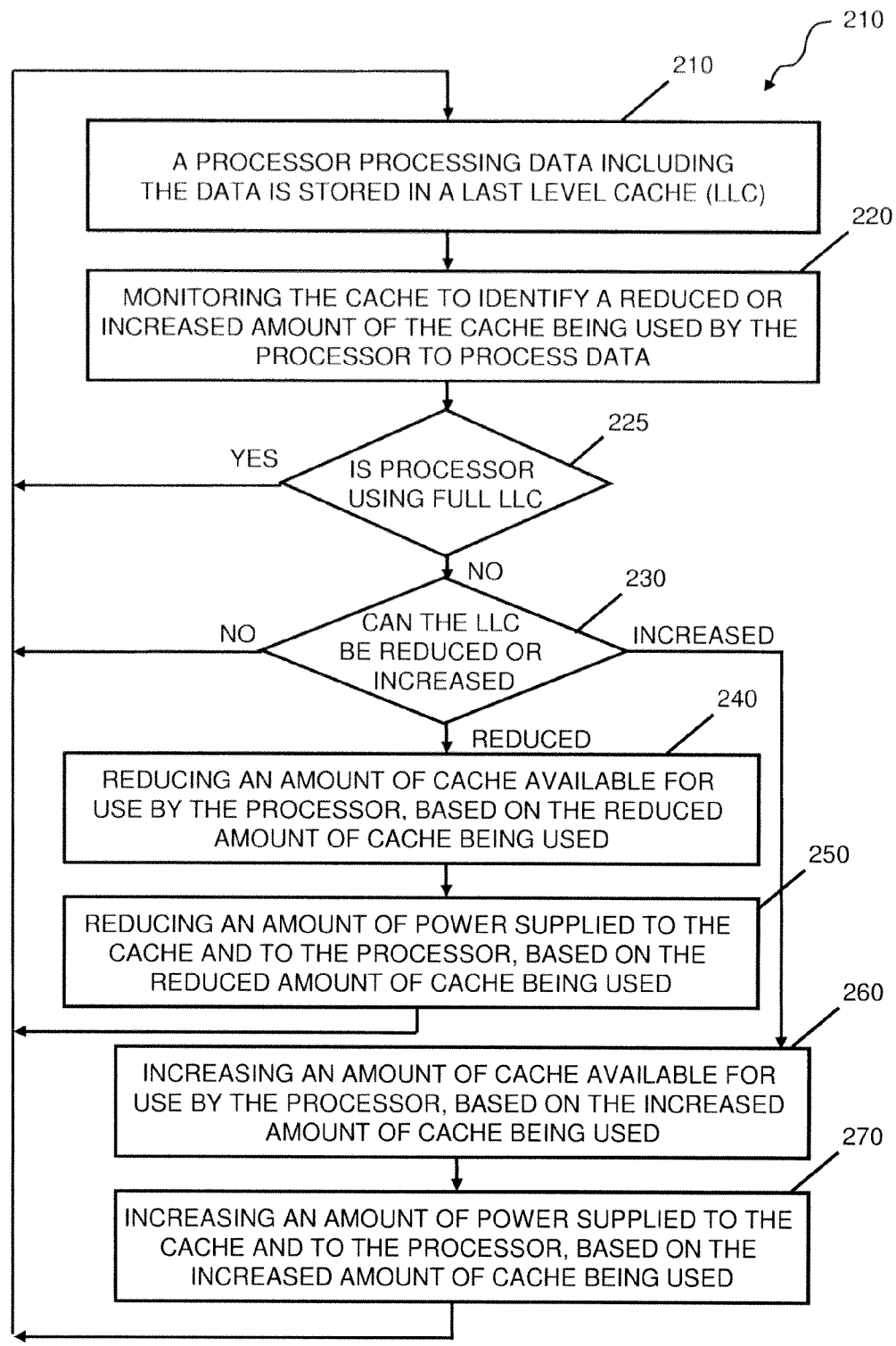
FIG. 2 is a flow diagram of a process that may be used to implement dynamic cache sizing and cache operating voltage management for optimal power performance, according to some embodiments of the present invention.

FIG. 2 is a flow diagram of process 200 that may be used to implement dynamic cache sizing and cache operating voltage management for optimal power performance, according to some embodiments of the present invention. Process 200 may be performed by hardware circuitry of processor 102 and may be controlled by circuitry of control unit 140 and FSM 150. Process 200 may occur while the processor is in an active processor power state.

At block 210 a processor (e.g., processor 102 or execution unit 110) is performing processing of data, including data stored in a last level cache (LLC). Block 210 may describe a processor (e.g., cores 112, 114 using LLC 120) executing data for an operating system, and optionally also for one or more applications (e.g., software applications) running on that operating system. Such execution may include processor sleep modes, operating system scheduling, DVD playing, Internet media streaming, and disc virus scans. In some cases, block 210 includes the operating voltage of execution unit 110 (e.g., controlled by line 144) being the maximum operating voltage allowed or being the voltage required for the maximum cache size of cache 120 allowed.

At block 220 the cache is monitored to identify a reduced or increased amount of the cache being used by a processor to process data. Block 220 may include monitor code of a power control unit monitoring the cache to identify a reduced or increased amount of cache being used by the processor to process data. Block 220 may include code 160 continuous or periodic monitoring data signals on line 142, and communicating the result to unit 140. Such monitoring may include descriptions above for code 160 and line 142.

At decision block 225 it is determined whether the processor is using the full amount of the last level cache. This may include determining whether the processor is using the total or maximum size of the cache. Block 225 may include code 160 or unit 140 comparing the monitored amount of the cache being used in block 220 to one or more thresholds, to identify whether the processor is using the full amount of the last level cache during processing of the data at block 210. In some cases, such a determination can be described as related to an operating system and an application running on the processor. Such determining may include descriptions above for PCU 140, code 160 and line 142.

In some cases, block 225 includes a PCU or monitor code identifying whether the processor is using the full amount of the last level cache. If the processor is using the full amount of the last level cache (e.g., an amount greater than an amount that would cause a decrease in the amount of cache available for use by the processor), processing returns to block 210. Here, the amount of the cache being used by the processor to process data is not detected or identified to be sufficiently less than the maximum size of the cache to cause a decrease in the amount of cache available for use by the processor. While the amount has not changed (e.g., has not decreased or increased greater than a threshold), the current cache size available to the process and the current operating power to the execution unit may be maintained or otherwise controlled by unit 140, or otherwise (e.g., by operating system and other hardware) (thus returning the process to block 210).

Alternatively, in some cases, if the processor is note using the full amount of the last level cache (e.g., is using a reduced amount that would cause a decrease in the amount of cache available for use by the processor), processing continues to block 230. Here, the amount of the cache being used by the processor to process data is detected or identified to be sufficiently less than the maximum size of the cache to cause a decrease in the amount of cache available for use by the processor.

At decision block 230 it is determined whether a size of the LLC available to the processor can be reduced or increased. This may be based on an amount of the cache currently being used by the processor to process data. Such basis may include using the amount currently being used to determine or calculate certain factors, metrics and/or heuristics that will be used to make the decision at block 230. Block 230 may include code 160 or unit 140 comparing the monitored amount of the cache being used in block 220 (and factors, metrics and/or heuristics) to one or more thresholds, to identify whether an increase or decrease in the amount of cache used to perform processing of the data at block 210 is sufficient to cause a change (e.g., decrease or increase) in the amount of cache available for use by the processor. In some cases, determined whether a size of the LLC available to the processor can be reduced or increased can be described as related to an operating system and an application running on the processor.

Block 230 may include using metrics and heuristics to determine whether an amount of the cache being used by the processor to process data should cause a change (e.g., decrease or increase) in the amount of cache available for use by the processor. In some cases, the determination and change may be based on: (1) the detected size of the cache currently being used by the processor (if 4 MB used, then size to 4 MB available); (2) metrics and heuristics considering (1); or (3) both (1) and (2). Such determining may include descriptions above for PCU 140, code 160 and line 142.

In some cases, block 230 includes a PCU or monitor code identifying a reduced amount of cache being used by the processor to process data (e.g., which may be the amount monitored or detected at block 220 and/or block 225). If an amount of the cache being used by the processor to process data is reduced (e.g., sufficiently to cause a decrease in the amount of cache available for use by the processor), processing continues to block 240. In some cases, block 230 includes a PCU or monitor code identifying an increased amount of cache being used by the processor to process data. If an amount of the cache being used by the processor to process data is increased (e.g., sufficiently to cause a increase in the amount of cache available for use by the processor), processing continues to block 260. If a reduced or increased amount of the cache being used by the processor to process data is not detected or identified; or is not a sufficient change to cause a decrease in the amount of cache available for use by the processor, processing returns to block 210. While the amount has not changed (e.g., has not decreased or increased greater than a threshold), the current cache size available to the process and the current operating power to the execution unit may be maintained or otherwise controlled by unit 140, or otherwise (e.g., by operating system and other hardware) (thus returning the process to block 210).

At block 240 an amount of cache available for use by the processor is reduced, based on the reduced amount of cache being used or identified at blocks 220-230. In some cases, the change (reduction) may be based on: (1) the detected size of the cache currently being used by the processor (if 4 Mb used, then size to 4 Mb available); (2) metrics and heuristics considering (1); or (3) both (1) and (2). The change or reduction may be performed in order to reduce the amount of cache available and power consumed for energy efficiency and energy conservation in integrated circuits. Since only a reduced amount of cache is needed for processing to continue at the same speed and performance level, the amount of cache available and power consumed can be reduced without decreasing processing speed and performance. Block 240 may include an FSM reducing the amount of cache available for use by the processor, based on a cache size control signal received from the power control unit, where the cache size control signal is based on the reduced amount of cache being used (e.g., as detected in block 230). In come cases, reducing the amount of cache available includes removing the processors ability to access a portion of the cache (e.g., the portion reduced), based the reduced amount of cache (e.g., portion not available to the processor). Reducing an amount of cache available for use by the processor may include descriptions above for PCU 140, code 160, line 146, FSM 150 and line 154.

At block 250 an amount of power supplied to the cache and to the processor is reduced, based on the reduced amount of cache being used. Block 250 may be or include reducing the amount of power supplied to cache 120 and to unit 110 (e.g., cores 112 and 114). Reducing at block 250 may be based on the reduced amount of cache available for use by the processor at block 240. In some cases, reducing at block 250 may be based on the reduced amount of cache identified as being used by the processor at block 230. For example, the amount of power supplied to the cache and to the processor may be reduced to match (or to be the next controllable or programmable level needed to support) the reduced amount of cache identified as being used by the processor at block 230. In come cases, reducing reducing the amount of power supplied to the cache comprises removing power from a part of the cache having a size less than the size of the portion of the cache reduced (e.g., the portion not available to the processor). Reducing an amount of power supplied to the cache and to the processor may include descriptions above for PCU 140, code 160, line 146, line 144 and gates 130.

The change or reduction may be performed to reduce the amount of power consumed, thus increasing the energy efficiency and energy conservation of processor 102. Since only a reduced amount of cache is provided as available to the processor (e.g., at block 240) the amount of power provided for use by the processor (e.g., cache 120 and unit 110) can be reduced without decreasing processing speed and performance.

At block 260 an amount of cache available for use by the processor is increased, based on the increased amount of cache being used or identified at blocks 220-230. In some cases, the change (increase) may be based on: (1) the detected size of the cache currently being used by the processor (if 4 Mb used, then size to 4 Mb available); (2) metrics and heuristics considering (1); or (3) both (1) and (2). The change or increase may be performed in order to increase the amount of cache available and power consumed so that more data can be processed or so that processing can be performed more quickly. Since a larger amount of cache is needed for processing to continue at the same or a greater speed and performance level, the amount of cache available and power consumed can be increased to avoid decreasing processing speed and performance. Block 260 may include an FSM increasing the amount of cache available for use by the processor, based on a cache size control signal received from the power control unit, where the cache size control signal is based on the increased amount of cache being used (e.g., as detected in block 230). Increasing an amount of cache available for use by the processor may include descriptions above for PCU 140, code 160, line 146, FSM 150 and line 154.

At block 270 an amount of power supplied to the cache and to the processor is increased, based on the increased amount of cache being used. Block 270 may be or include increasing the amount of power supplied to cache 120 and to unit 110 (e.g., cores 112 and 114). Increasing at block 250 may be based on the increased amount of cache available for use by the processor at block 240. In some cases, increasing at block 250 may be based on the increased amount of cache identified as being used by the processor at block 230. For example, the amount of power supplied to the cache and to the processor may be increased to match (or to be the next controllable or programmable level needed to support) the increased amount of cache identified as being used by the processor at block 230. In some cases it may be increased to the maximum allowable operating voltage or the operating voltage required to support the maximum size of the cache. Increasing an amount of power supplied to the cache and to the processor may include descriptions above for PCU 140, code 160, line 146, line 144 and gates 130.

The change or increase may be performed to allow processing to continue at the same or a greater speed and performance level, since the amount of cache available and power consumed was increased to avoid decreasing processing speed and performance of processor 102. Since an increased amount of cache is provided as available to the processor (e.g., at block 260) the amount of power provided for use by the processor (e.g., cache 120 and unit 110) should be increased to avoid decreasing processing speed and performance.

After block 270, processing returns to block 210 to allow the processor to continue processing data, while being monitored to determine whether a reduced or increased amount of the cache is being used by the processor to process data (e.g., at blocks 220-230).

Additional Descriptions of Processor "C" and "P" States

According to embodiments, processor 102 (e.g., Execution unit 110) may be put into (e.g., changed to) various processor "C" states (e.g., CPU states or operating states), such as depending on processing, power and thermal requirements. For one approach, an operating system may support a built-in power management software interface such as Advanced Configuration and Power Interface (ACPI) specification (for example, ACPI Specification, Revision 4.0a, published on Apr. 5, 2010 . . . Rev. 3.0, Sep. 2, 2004; Rev. 2.0c, Aug. 25, 2003; Rev. 2.0, Jul. 27, 2000, etc.). ACPI describes a power management policy including various "C states" that may be supported by processors and/or chipsets. For this policy, C0 is defined as the Run Time state in which the processor operates at high voltage and high frequency. C1 is defined as the Auto HALT state in which the core clock is stopped internally. C2 is defined as the Stop Clock state in which the core clock is stopped externally. C3 is defined as a Deep Sleep state in which all processor clocks are shut down, and C4 is defined as a Deeper Sleep state in which all processor clocks are stopped and the processor voltage is reduced to a lower data retention point. C5 is a Deeper Sleep state in which the processor voltage is reduced to near zero, but some components remain powered so the computer can "wake" from input from the keyboard, clock, modem, LAN, or USB device. C6 is a Deeper Sleep state known as the zero, near zero, or voltage sleep state. It may also be described as the "deep sleep" or "off" state.

Processor 102 (e.g., Execution unit 110) may also be put into (e.g., changed to) various power "P" states (e.g., performance states during C0 state), such as depending on processing, power and thermal requirements. These states may also be operating system supported based on an ACPI built-in power management software interface. These states may be implementation-dependent, where P0 is the highest-performance state, with P1 to Pn being successively lower-performance states, up to an implementation-specific limit of n (typically no greater than 16).

In some cases, P0 is a maximum power and frequency for the processor (e.g., resulting from unit 140 sending a control signal to unit 110, such as via line 144 to gates 130). P1 may be less than P0, by having voltage/frequency scaled down, such as to a Thermal Design Point at which the processor is designed to operate for extended periods of time without overheating (e.g., exceeding a temperature threshold of the processor, such as read by sensor 120, where the threshold is selected to avoid or prohibit negatively affecting performance, damaging components, or reducing battery life). Pn may be less than P1, by having voltage/frequency scaled down, such as to a Thermal Throttle Point at which the processor is designed to operate for a period of time without overheating. In some cases, Thermal Throttle Point is selected (e.g., predetermined during design of the processor) so that the processor operates, while reducing the temperature of the processor.

Processor 102 (e.g., Execution unit 110) may be put into or removed from any of the above C or P states as a result of unit 140 sending a control signal to unit 110 (e.g., via line 144 to gates 130). The C and P states generally have different entry/exit latencies and power savings.

Figure 3:
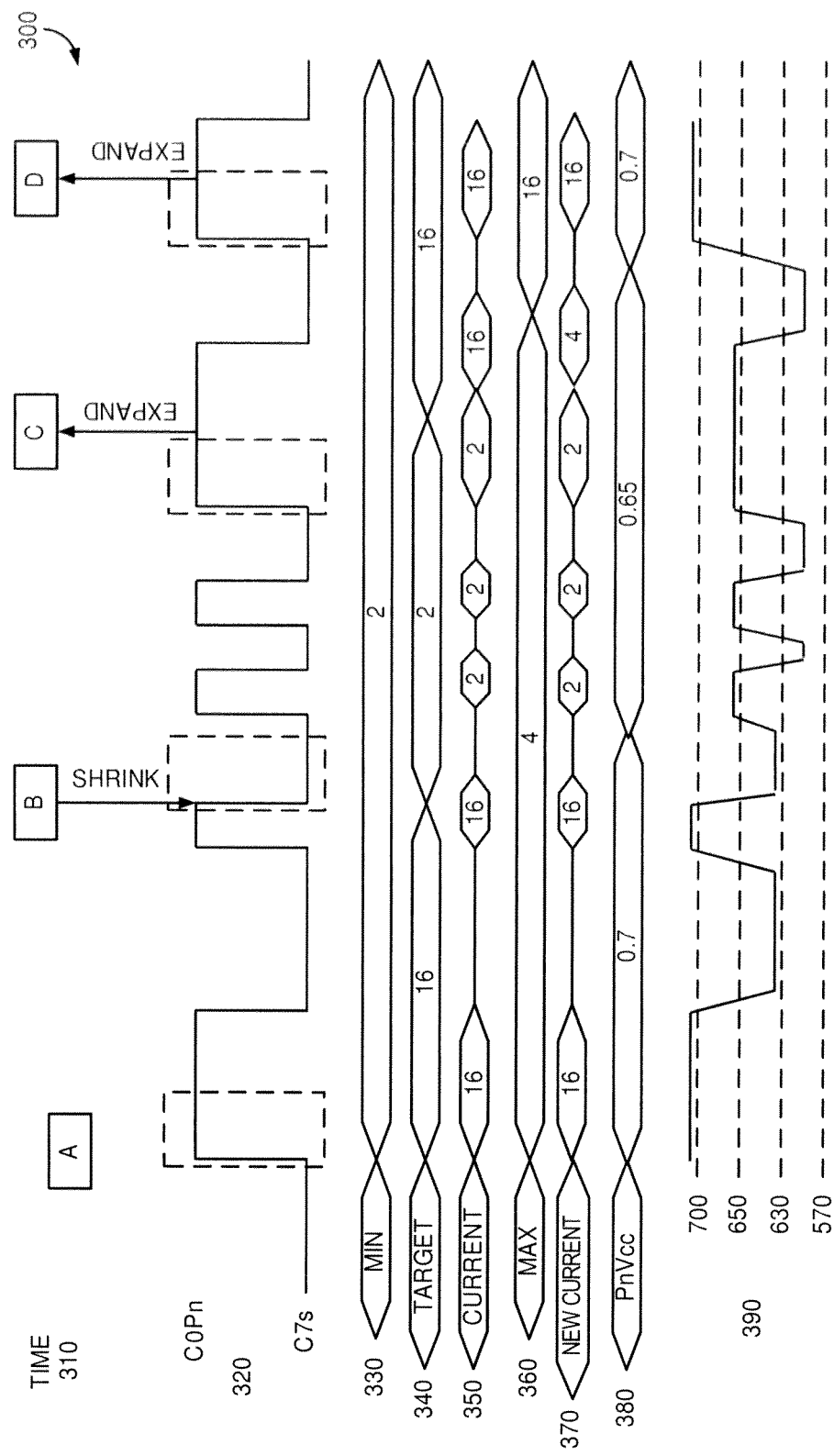
FIG. 3 is a processor power state and cache profile graph that may be used to implement dynamic cache sizing and cache operating voltage management for optimal power performance, according to some embodiments of the present invention.

FIG. 3 is a processor power state and cache profile graph with respect to time, that may be used to implement dynamic cache sizing and cache operating voltage management for optimal power performance, according to some embodiments of the present invention. FIG. 3 may be described as a DCS Entry Exit Flow diagram. FIG. 3 shows graph 300 plotting time 310, C-state 320 (e.g., processor power state), Min 330 (e.g., cache minimum number of ways needed for processing of data currently being processed by the processor), Target 340 (e.g., cache targeted number of ways needed), Current 350 (e.g., cache current number of ways needed), Max 360, New Current 370, PnVcc 380 (e.g., operating voltage changed to due to sizing the cache available to the processor), and operational voltage level 390 (actual operating voltage consumed by the processor). The plots of graph 300 may apply to processor 102, and specifically, to execution unit 110, and LLC 120.

In the above example, as the package goes in an out of C0/C7 (see C-state 320), graph 300 shows the points (in time) when DCS is activated (see time 310 at B), the voltage at which the core/LLC is operating (see PnVcc 380, and voltage level 390) and the break events that bring it back to the original state (see time 310 at C and D).

Time 310, shows monitoring "sniffs" A, B, C and D (e.g., as described for code 160, line 142 and blocks 220-230). Each sniff may be a periodic "sniff" or reading (e.g., by code 160) of an existing signal of cache 120, or may be a periodic output by monitor circuitry existing in cache 120 to code 160. Such period between sniffs A, B, C and D may be between 100 milliseconds and 1 second. In some cases the period may be 100, 200, 500 or 750 milliseconds. Also, such a period of "sniffing" (e.g., duration of A, B, C and D) may be 0.5, 1 or 2 milliseconds. In some cases the period may be 1 millisecond.

According to some embodiments, additional variable MAX 360 is calculated as the maximum number of ways of cache 120 that can be open with the lower VccMin, based on LLC Testing (e.g., during design and testing of processor 102, unit 110 and LLC 120). In some cases, Max 360 is the maximum size of the reduced cache that can run at the lowest voltage (active VccMin). In some cases, this can be determined either through simulation or silicon experiements. In these embodiments, MAX 360 is required to be >=MIN (# LLC ways needs for processor microarchitecture ("uarch") inclusiveness). In these embodiments, additional variable NEW CURRENT 370 is the number of ways open in the LLC when in DCS mode. Also, in these embodiments, the LLC shrink/expand FSM will move the LLC ways open/close policy to NEW CURRENT=MAX in this mode.

According to some embodiments, an LLC Shrink/Expand logic is used to size the cache. This logic may be harware logic implementing a process or an "algorithm & sequence". In some cases the logic may be or may include software, BIOS, or ROM programming. The logic may encompasses the metrics needed to evaluate whether the LLC size should be changed (e.g., reduced or increased) or not, and at what granularity (e.g., the number of divisions of the total cache size). In these embodiments, the LLC Expand logic may be changed to add controls based on mode select, ie; UI (User Interface) preference, FS (Full Screen) mode etc. which are going to be made available to the CPU u-controller through the Graphics driver interface. In these embodiments, the algorithm may limit LLC expand to new (max allowable) size or amount during this new operating mode. In these embodiments, there may be 3 variables that are being tracked today for the LLC shrink/expand logic. The first is MIN 330—the minimum number of ways that are needed in LLC (to maintain inclusiveness with the MLC). The second is TARGET 340—the target number of ways that we need to keep open. In these embodiments, TARGET should always be >=MIN. The third is CURRENT 350—this is the current number of ways open in the LLC. In these embodiments, if the CURRENT=TARGET, the FSM will be in idle.

In addition, in these embodiments, (e.g., this new processor microarchitecture ("uarch")), 2 more variables are added. The first additional variable is MAX 360—the maximum number of ways that can be open with the lower VccMin (650 mV), based on LLC Testing. MAX>=MIN. The second new variable is NEW CURRENT 370—this is the number of ways open when we are in this new mode. In these embodiments, the LLC shrink/expand FSM will move the LLC ways open/close policy to NEW CURRENT=MAX in this mode (e.g., dynamic "sizing" of the cache).

According to some embodiments, FIG. 3 is a DCS Entry Exit Flow diagram with respect to Time 310 A, B, C and D. In these embodiments, [Time A] starts with MAX=4, and operating point at 16 ways (Full LLC) with VccMin (PnVcc) at 0.7V. In these embodiments, as we shrink the LLC, we get to the MIN value (2 ways open). In these embodiments, [Time B] is where the new control mechanism (e.g., dynamically sizing the cache) kicks in, as long as the number of ways open is below MAX, the operating voltage is kept at the lower Vccmin (0.65V). In these embodiments, most of our operating time will be spent in this mode. In these embodiments, at [Time C] we start the expand flow, the first expand takes us from MIN→MAX (Cache Size goes from 2→4), so that we can continue in this lower power mode. In these embodiments, without this feature, we would be expanding to full LLC (16 ways) on this expand. In these embodiments, we will continue in this low power mode until we hit another expand window. In these embodiments, at [Time D], if we hit another expand window, which could be either due to continuous C0 time over a threshold period or a higher P-state request, based on CPU utilization, we will roll back to the full LLC size (16 ways) and the operating voltage will be moved up (first) to a higher value (0.7V). In these embodiments, we may make sure that we have the higher operating voltage before we open the additional ways in the LLC. In these embodiments, this is done with a handshake communication between the u-controller and the Geyserville FSM (e.g., FSM 150). In these embodiments, to maximize our power savings, we may make sure that we spend most of our time between Timelines B and C.

According to some embodiments, in addition to optimizing the entry/exit sequence, we also look at the actual work done by both the compute engines during media playback. In these embodiments, the CPU may be in C0 (Active) for about 40-50% of the frame length and the rest of the time may be spent servicing multiple the 1 mS interrupts. In these embodiments, since most of the time will be spent in the "low activity optimized vccmin" mode during media playback, we expect to get good power savings with this feature (e.g., dynamically sizing the cache).

Figure 4:
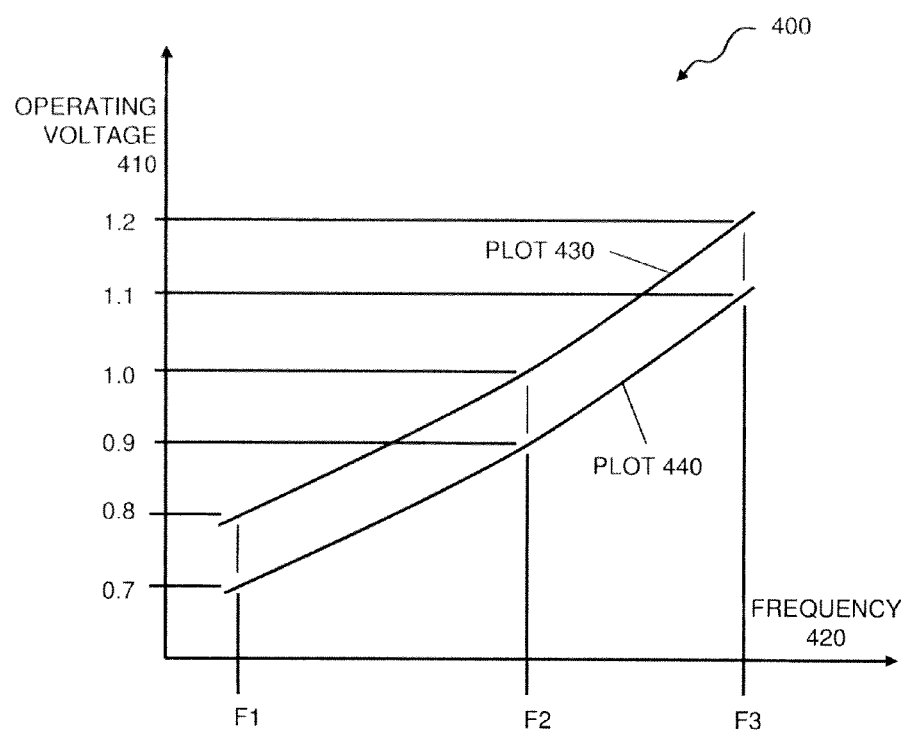
FIG. 4 is an operating voltage and frequency graph that may be used to implement dynamic cache sizing and cache operating voltage management for optimal power performance, according to some embodiments of the present invention.

FIG. 4 is an operating voltage and frequency on graph that may be used to implement dynamic cache sizing and cache operating voltage management for optimal power performance, according to some embodiments of the present invention. FIG. 4 shows graph 400 having plots 430 and 440 of different cache sized available to the processor, plotted with respect to operating voltage 410 and frequency 420. Operating voltage 410 may be an amount of power supplied to the cache and to the processor (e.g., to core #0, core #1 and the LLC); and frequency 420 may be the clock supplied to the cache and to the processor. Operating voltage 410 is shown in a range between 0.8 volts and 1.2 volts. Frequency 420 may be a range between 1.2 and 3.6 GHz.

Plot 430 is a curve representing the operating voltage and frequency necessary to support the processor for a large size of cache (e.g., such as a maximum, 100 percent, or total size of the cache). Plot 440 is a curve representing the operating voltage and frequency necessary to support the processor for a smaller size of cache (e.g., such as a dynamically sized minimum, 25 percent, or minimum operational size of the cache). In some cases plot 430 may represent an 8 Mb amount of cache, and plot 440 may represent a 2 Mb amount of cache.

Frequencies F1, F2 and F3 represent increasing clock frequencies, such as the frequency of the processor when at different P-States. For example, F1 may correspond to Pn; F2 to P1; and F3 to P0.

It can be seen that by shrinking or reducing an amount of of cache available for use by the processor such as from plot 430 to plot 440 (e.g., based on the reduced amount of cache being used), less operating voltage 410 may be needed to perform the same amount of processing at frequency 420 (e.g., at the same clock rate). Thus, in addition to reducing the amount of cache available, it is also possible to reduce power supplied to the cache and to the processor, based on the reduced amount of cache being used (and/or based on the reduced amount of of cache available for use by the processor). Specifically, at F1, the voltage needed drops from 0.8 to 0.7 volts; at F2, the voltage needed drops from 1.0 to 0.9 volts; and at F3, the voltage needed drops from 1.2 to 1.1 volts.

The graphs of FIGS. 3 and 4 may be applicable when certain applications are running on the processor, which use hardware acceleration do not utilize the LLC but still spend a considerable amount of time in active C-state (e.g., package C0). They may apply C-states that do not include C6-state. Such applications may include media playback, processor sleep modes, operating system scheduling, DVD playing, Internet media streaming, and disc virus scans.

Thus, embodiments described herein can perform dynamic cache sizing and cache operating voltage management designed to achieve optimal power and performance. Such dynamic cache sizing and cache operating voltage management can reduce operational inefficiently that would have been caused by using a larger cache than needed and potentially higher operating voltage than needed. It can also reduce power wasted by leakage, due to the cache being powered by the operating voltage needed to support the full size of the cache. Such reductions may provide increased energy efficiency and energy conservation. It can be appreciated that the concepts of FIGS. 3 and 4 can be applied to other designs of processors, cores, LLCs, etc, in addition to those shown herein.

Figure 5:
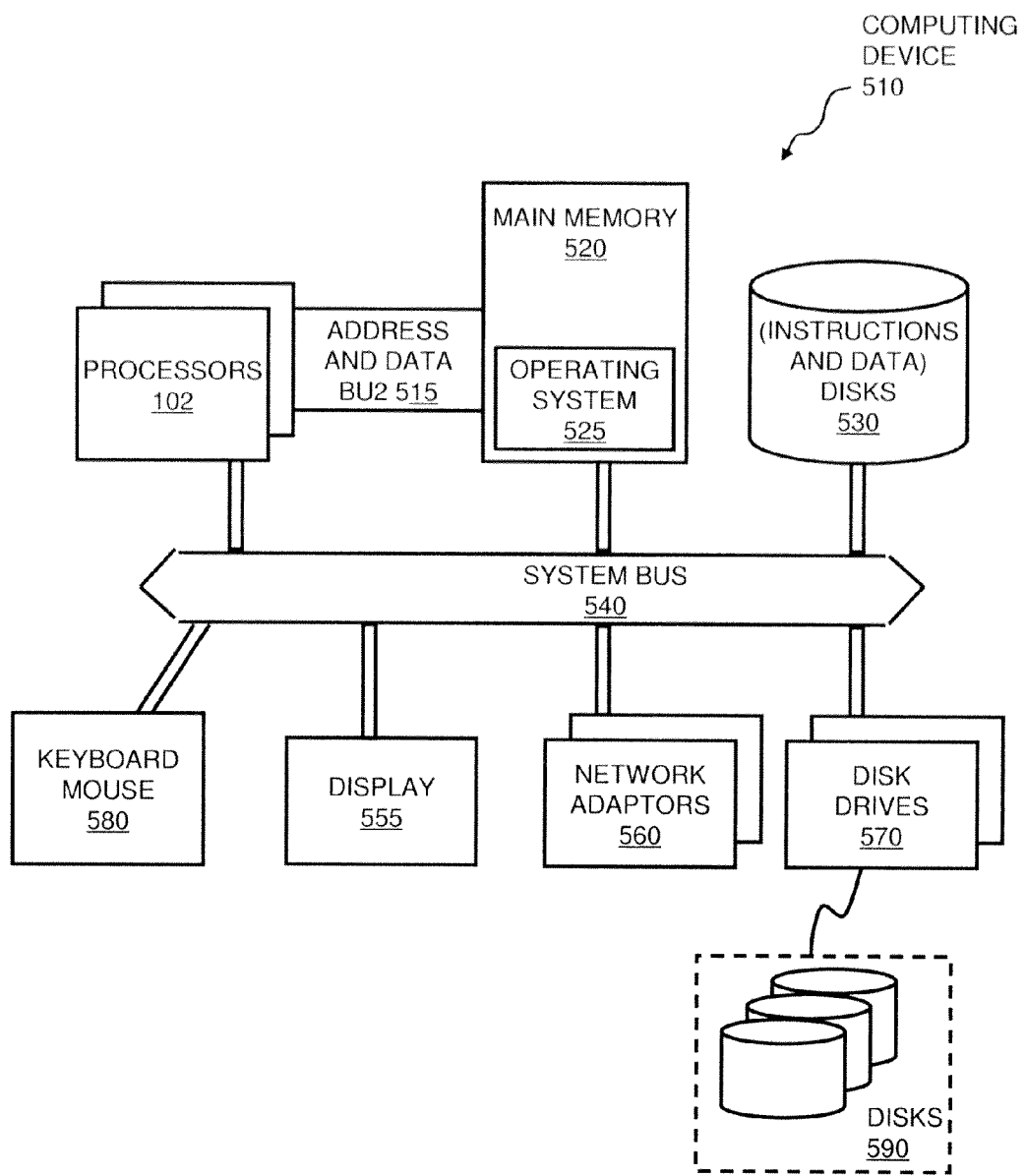
FIG. 5 is a block diagram of a computing device that may be used to implement dynamic cache sizing and cache operating voltage management for optimal power performance, according to some embodiments of the present invention.

FIG. 5 is a block diagram of a computing device that may be used to implement dynamic cache sizing and cache operating voltage management for optimal power performance, according to some embodiments of the present invention. FIG. 5 shows computing device 510 including processor 102 (e.g., die 104), memory 520 having operating system 525, and bus 515.

Processor 102 is coupled to memory 520 via bus 515 to process data stored in the memory. Processor 102 is also coupled to disks 530, network adaptors 560, disk drives 570, I/O devices 580 and display 555 by system bus 540. Buses 515 and 540 may communicate signals between the coupled components, using protocols, as known in the art. Certain standard well-known components, which are not germane to embodiments of the invention, may not be shown.

Bus 540, may be an abstraction that represents any one or more separated physical buses and/or point-to-point connections, connected by appropriate bridges, adapters and/or controllers. Bus 540, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire"). In some cases, bus 540, is a host bus, such as a bus to interface a host (e.g., processors 102) to peripheral devices (e.g., disks 530). I/O devices 580 may include a keyboard and/or mouse interface. Bus 540 is interfaced to display 555 as known in the art.

Processors 102 may be the central processing units (CPUs), and, thus control and coordinate the overall operation of device 510. Processors 102 may accomplish this by executing software, such as the operating system, middleware programs, and applications stored in memory 520.

Processors 102 may represent one or more processors, as known in the art. Processors 102 may represent one LLC shared by multiple execution cores, as known in the art (e.g., as noted above). These concepts can also be applied to Processors 102 representing more than one LLC shared by multiple execution cores, as known in the art. In addition, these concepts can also be applied to Processors 102 representing more than one processor, as known in the art. In each of these cases, each core and LLC may be power managed or controlled by a single unit 140 as described herein. Also, each LLC may be dynamically sized or have its amount available to the cores controlled by a single unit 140 as described herein. In some cases, there may be a separate unit 140 located on each processor die 104 to provide independent management and sizing (e.g. of all the cores and LLCs on its die). In other cases, a single unit 140 (located on one die or otherwise) may provide shared management and sizing (e.g. of all the cores and LLCs on all of the die), such as by sending different control signals to each core and LLC.

Memory 520 may be or include the "main memory" of device 510. Memory 520 represents any form of random access memory (RAM), read-only memory (ROM), flash memory, or the like, or a combination of such devices. The operating system, middleware programs, and/or applications stored in memory 520 may be (e.g., the "software" or machine programmable instructions) as noted herein. Processor 102 has direct access to main memory 520 via an address and data bus 515. Address and data bus 515 may be an address and data bus as known in the art.

Network adapters 560 provide device 510 with the ability to communicate with remote devices, such as remote computers, over a network (e.g., wired or wireless networks) and may be, for example, an Ethernet adapter or Fiber Channel adapter. Network adapters 560 provide device 510 with the ability to communicate with clients or server computers, such as over a local area network (LAN), intranet, the Internet, or various other networks over which data is communicated using wired optical, wireless, acoustical, electromagnetic radiation, or other medium as known in the art.

Disk 530 may contain other instructions and data that are not immediately required by the system in its operations. Disk drives 570 may be one or more devices that allow the computer to access memory or storage disks 590. Disk drives 570 may include a magnetic disk drive, a CD drive, a DVD driver, a USB port or other removable memory interface as known in the art to allow the computer to access memory or storage disks 590.

According to some embodiments, it is contemplated that device 510 may represent a computing device, such as a general purpose computing device and/or special purpose computing device, a desktop computer, a portable computing device, a handheld computing device, a telephone, a cellular telephone, a gaming device, an internet related computing device, a digital video disk (DVD) player, a set top box, etc., and/or another device or system that includes and uses processor 102 to process data.

In some cases, the components of processor 102 (e.g., unit 140) includes hardware logic, hardware, processors, machine executable code, memory, integrated circuits, programmable gate arrays, controllers, buffers, state machines, FPGAs, PLDs, active devices (e.g., transistors, etc.), passive devices (e.g., inductors, capacitors, resistors, etc.), and/or other circuit elements to perform energy efficient and power conserving dynamic cache sizing and cache operating voltage management for optimal power performance, according to embodiments of the present invention.

Exemplary Register Architecture

FIG. 6 is a block diagram of a register architecture 600 according to one embodiment of the invention. In the embodiment illustrated, there are 32 vector registers 610 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15.

Write mask registers 615—in the embodiment illustrated, there are 8 write mask registers (k0 through k7), each 64 bits in size. In an alternate embodiment, the write mask registers 615 are 16 bits in size. As previously described, in one embodiment of the invention, the vector mask register k0 cannot be used as a write mask; when the encoding that would normally indicate k0 is used for a write mask, it selects a hardwired write mask of 0xFFFF, effectively disabling write masking for that instruction.

General-purpose registers 625—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 645, on which is aliased the MMX packed integer flat register file 650—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the invention may use wider or narrower registers. Additionally, alternative embodiments of the invention may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures
In-Order and Out-of-Order Core Block Diagram

FIG. 7A is a block diagram illustrating both an exemplary in-order pipeline and an exemplary register renaming, out-of-order issue/execution pipeline according to embodiments of the invention. FIG. 7B is a block diagram illustrating both an exemplary embodiment of an in-order architecture core and an exemplary register renaming, out-of-order issue/execution architecture core to be included in a processor according to embodiments of the invention. The solid lined boxes in FIGS. 7A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 7A, a processor pipeline 700 includes a fetch stage 702, a length decode stage 704, a decode stage 706, an allocation stage 708, a renaming stage 710, a scheduling (also known as a dispatch or issue) stage 712, a register read/memory read stage 714, an execute stage 716, a write back/memory write stage 718, an exception handling stage 722, and a commit stage 724.

FIG. 7B shows processor core 790 including a front end unit 730 coupled to an execution engine unit 750, and both are coupled to a memory unit 770. The core 790 may be a reduced instruction set computing (RISC) core, a complex instruction set computing (CISC) core, a very long instruction word (VLIW) core, or a hybrid or alternative core type. As yet another option, the core 790 may be a special-purpose core, such as, for example, a network or communication core, compression engine, coprocessor core, general purpose computing graphics processing unit (GPGPU) core, graphics core, or the like.

The front end unit 730 includes a branch prediction unit 732 coupled to an instruction cache unit 734, which is coupled to an instruction translation lookaside buffer (TLB) 736, which is coupled to an instruction fetch unit 738, which is coupled to a decode unit 740. The decode unit 740 (or decoder) may decode instructions, and generate as an output one or more micro-operations, micro-code entry points, microinstructions, other instructions, or other control signals, which are decoded from, or which otherwise reflect, or are derived from, the original instructions. The decode unit 740 may be implemented using various different mechanisms. Examples of suitable mechanisms include, but are not limited to, look-up tables, hardware implementations, programmable logic arrays (PLAs), microcode read only memories (ROMs), etc. In one embodiment, the core 790 includes a microcode ROM or other medium that stores microcode for certain macroinstructions (e.g., in decode unit 740 or otherwise within the front end unit 730). The decode unit 740 is coupled to a rename/allocator unit 752 in the execution engine unit 750.

The execution engine unit 750 includes the rename/allocator unit 752 coupled to a retirement unit 754 and a set of one or more scheduler unit(s) 756. The scheduler unit(s) 756 represents any number of different schedulers, including reservations stations, central instruction window, etc. The scheduler unit(s) 756 is coupled to the physical register file(s) unit(s) 758. Each of the physical register file(s) units 758 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 758 comprises a vector registers unit, a write mask registers unit, and a scalar registers unit. These register units may provide architectural vector registers, vector mask registers, and general purpose registers. The physical register file(s) unit(s) 758 is overlapped by the retirement unit 754 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 754 and the physical register file(s) unit(s) 758 are coupled to the execution cluster(s) 760. The execution cluster(s) 760 includes a set of one or more execution units 762 and a set of one or more memory access units 764. The execution units 762 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 756, physical register file(s) unit(s) 758, and execution cluster(s) 760 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 764). It should also be understood that where separate pipelines are used, one or more of these pipelines may be out-of-order issue/execution and the rest in-order.

The set of memory access units 764 is coupled to the memory unit 770, which includes a data TLB unit 772 coupled to a data cache unit 774 coupled to a level 2 (L2) cache unit 776. In one exemplary embodiment, the memory access units 764 may include a load unit, a store address unit, and a store data unit, each of which is coupled to the data TLB unit 772 in the memory unit 770. The instruction cache unit 734 is further coupled to a level 2 (L2) cache unit 776 in the memory unit 770. The L2 cache unit 776 is coupled to one or more other levels of cache and eventually to a main memory.

By way of example, the exemplary register renaming, out-of-order issue/execution core architecture may implement the pipeline 700 as follows: 1) the instruction fetch 738 performs the fetch and length decoding stages 702 and 704; 2) the decode unit 740 performs the decode stage 706; 3) the rename/allocator unit 752 performs the allocation stage 708 and renaming stage 710; 4) the scheduler unit(s) 756 performs the schedule stage 712; 5) the physical register file(s) unit(s) 758 and the memory unit 770 perform the register read/memory read stage 714; the execution cluster 760 perform the execute stage 716; 6) the memory unit 770 and the physical register file(s) unit(s) 758 perform the write back/memory write stage 718; 7) various units may be involved in the exception handling stage 722; and 8) the retirement unit 754 and the physical register file(s) unit(s) 758 perform the commit stage 724.

The core 790 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 790 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

Figure 8B:
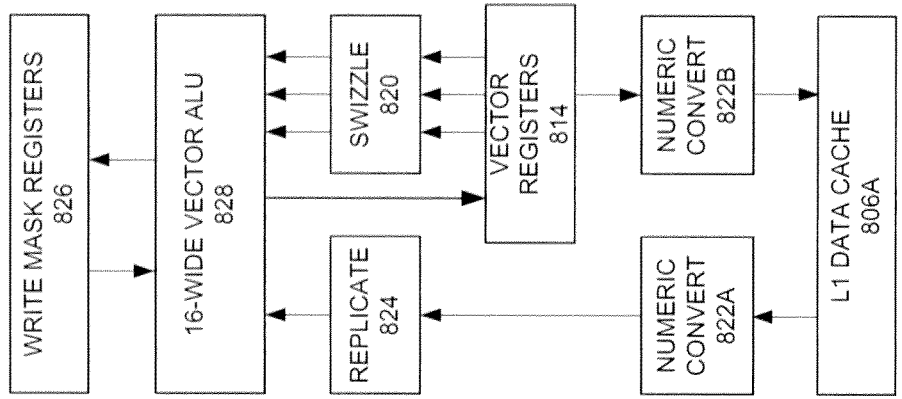
FIGS. 8A-B illustrate a block diagram of a more specific exemplary in-order core architecture, which core would be one of several logic blocks (including other cores of the same type and/or different types) in a chip.
Figure 8A:
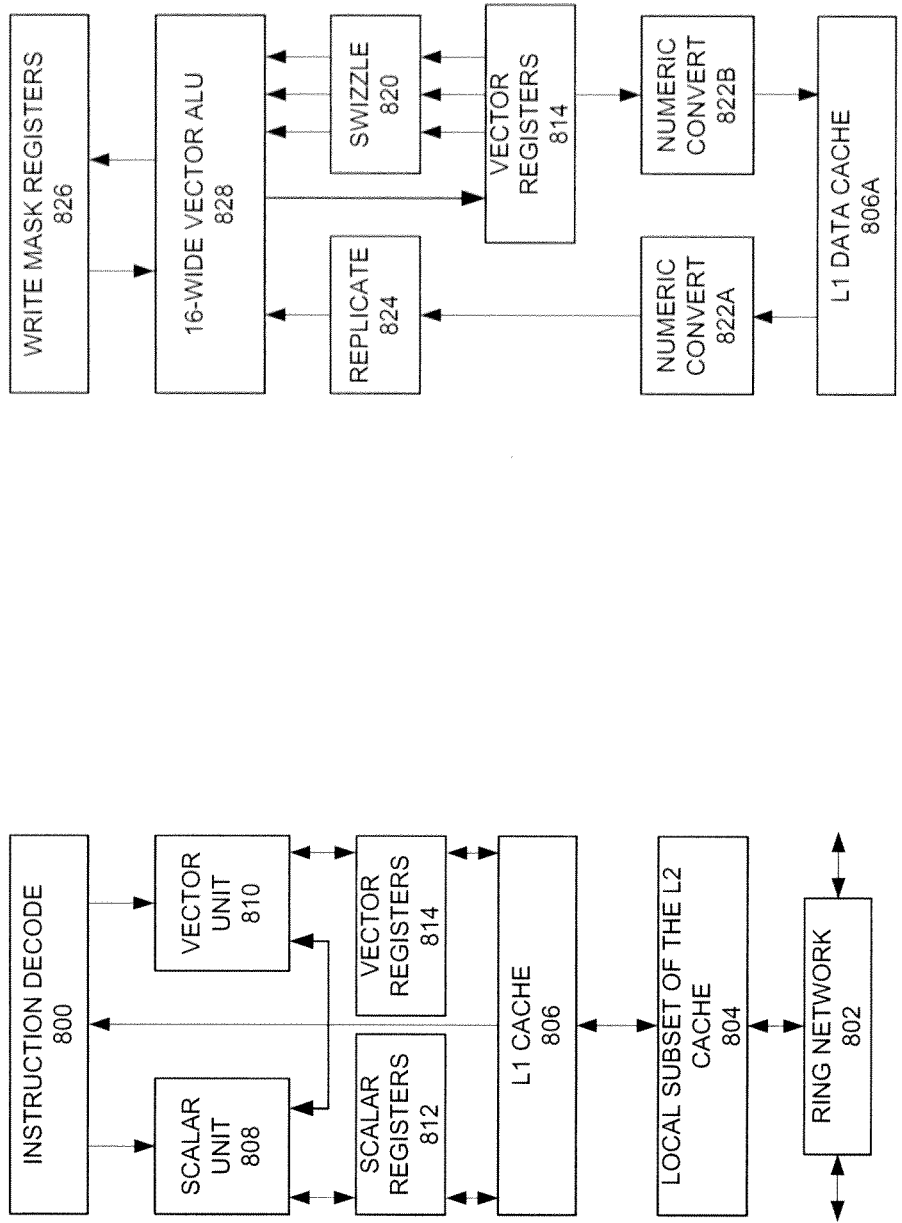

While register renaming is described in the context of out-of-order execution, it should be understood that register renaming may be used in an in-order architecture. While the illustrated embodiment of the processor also includes separate instruction and data cache units 734/774 and a shared L2 cache unit 776, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor. Specific Exemplary In-Order Core Architecture FIGS. 8A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 8A is a block diagram of a single processor core, along with its connection to the on-die interconnect network 802 and with its local subset of the Level 2 (L2) cache 804, according to embodiments of the invention. In one embodiment, an instruction decoder 800 supports the x86 instruction set with a packed data instruction set extension. An L1 cache 806 allows low-latency accesses to cache memory into the scalar and vector units. While in one embodiment (to simplify the design), a scalar unit 808 and a vector unit 810 use separate register sets (respectively, scalar registers 812 and vector registers 814) and data transferred between them is written to memory and then read back in from a level 1 (L1) cache 806, alternative embodiments of the invention may use a different approach (e.g., use a single register set or include a communication path that allow data to be transferred between the two register files without being written and read back).

The local subset of the L2 cache 804 is part of a global L2 cache that is divided into separate local subsets, one per processor core. Each processor core has a direct access path to its own local subset of the L2 cache 804. Data read by a processor core is stored in its L2 cache subset 804 and can be accessed quickly, in parallel with other processor cores accessing their own local L2 cache subsets. Data written by a processor core is stored in its own L2 cache subset 804 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 8B is an expanded view of part of the processor core in FIG. 8A according to embodiments of the invention. FIG. 8B includes an L1 data cache 806A part of the L1 cache 804, as well as more detail regarding the vector unit 810 and the vector registers 814. Specifically, the vector unit 810 is a 16-wide vector processing unit (VPU) (see the 16-wide ALU 828), which executes one or more of integer, single-precision float, and double-precision float instructions. The VPU supports swizzling the register inputs with swizzle unit 820, numeric conversion with numeric convert units 822A-B, and replication with replication unit 824 on the memory input. Write mask registers 826 allow predicating resulting vector writes.

Processor with Integrated Memory Controller and Graphics

Figure 9:
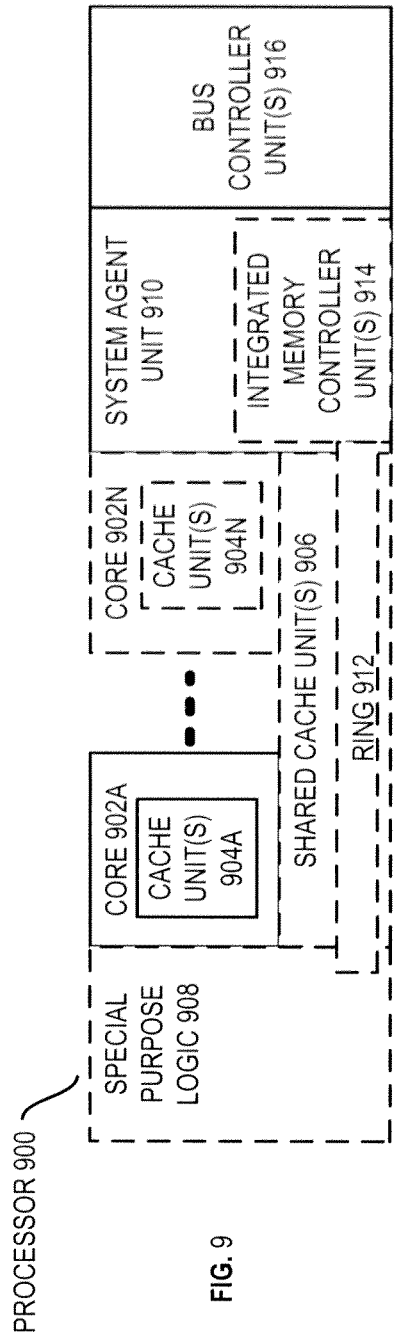
FIG. 9 is a block diagram of a processor that may have more than one core, may have an integrated memory controller, and may have integrated graphics according to embodiments of the invention.

FIG. 9 is a block diagram of a processor 900 that may have more than one core, may have an integrated memory controller, and may have integrated graphics according to embodiments of the invention. The solid lined boxes in FIG. 9 illustrate a processor 900 with a single core 902A, a system agent 910, a set of one or more bus controller units 916, while the optional addition of the dashed lined boxes illustrates an alternative processor 900 with multiple cores 902A-N, a set of one or more integrated memory controller unit(s) 914 in the system agent unit 910, and special purpose logic 908.

Thus, different implementations of the processor 900 may include: 1) a CPU with the special purpose logic 908 being integrated graphics and/or scientific (throughput) logic (which may include one or more cores), and the cores 902A-N being one or more general purpose cores (e.g., general purpose in-order cores, general purpose out-of-order cores, a combination of the two); 2) a coprocessor with the cores 902A-N being a large number of special purpose cores intended primarily for graphics and/or scientific (throughput); and 3) a coprocessor with the cores 902A-N being a large number of general purpose in-order cores. Thus, the processor 900 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 900 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 906, and external memory (not shown) coupled to the set of integrated memory controller units 914. The set of shared cache units 906 may include one or more mid-level caches, such as level 2 (L2), level 3 (L3), level 4 (L4), or other levels of cache, a last level cache (LLC), and/or combinations thereof. While in one embodiment a ring based interconnect unit 912 interconnects the integrated graphics logic 908, the set of shared cache units 906, and the system agent unit 910/integrated memory controller unit(s) 914, alternative embodiments may use any number of well-known techniques for interconnecting such units. In one embodiment, coherency is maintained between one or more cache units 906 and cores 902-A-N.

In some embodiments, one or more of the cores 902A-N are capable of multi-threading. The system agent 910 includes those components coordinating and operating cores 902A-N. The system agent unit 910 may include for example a power control unit (PCU) and a display unit. The PCU may be or include logic and components needed for regulating the power state of the cores 902A-N and the integrated graphics logic 908. The display unit is for driving one or more externally connected displays.

The cores 902A-N may be homogenous or heterogeneous in terms of architecture instruction set; that is, two or more of the cores 902A-N may be capable of execution the same instruction set, while others may be capable of executing only a subset of that instruction set or a different instruction set.

Exemplary Computer Architectures

FIGS. 10-13 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 10:
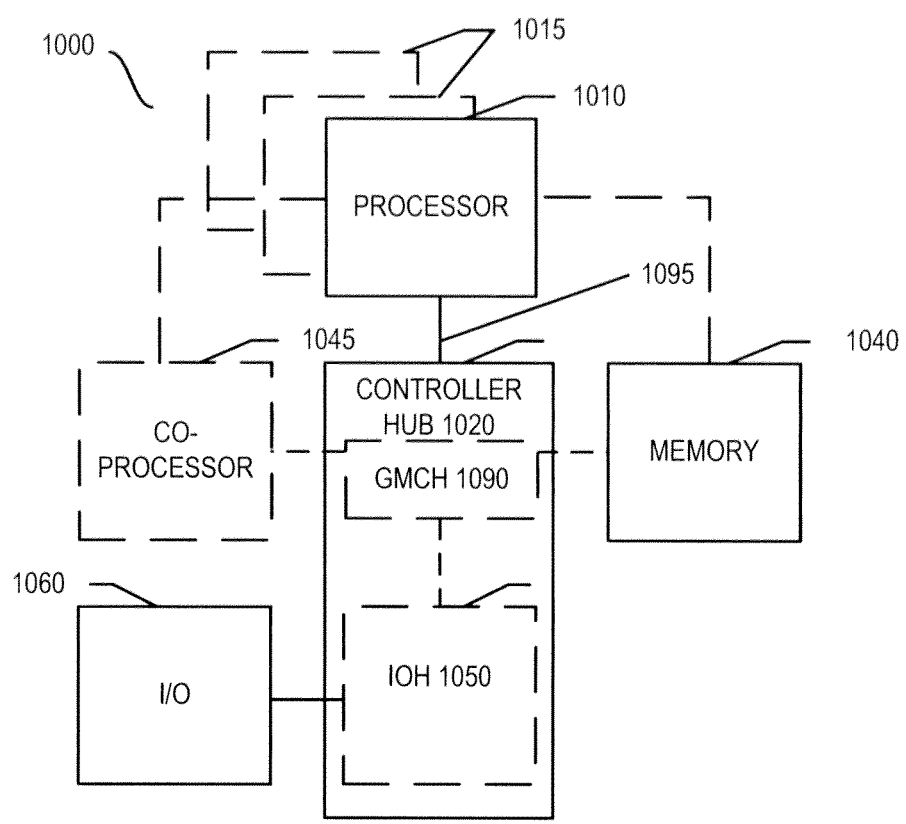
FIG. 10 shows a block diagram of a system in accordance with one embodiment of the present invention.

Referring now to FIG. 10, shown is a block diagram of a system 1000 in accordance with one embodiment of the present invention. The system 1000 may include one or more processors 1010, 1015, which are coupled to a controller hub 1020. In one embodiment the controller hub 1020 includes a graphics memory controller hub (GMCH) 1090 and an Input/Output Hub (IOH) 1050 (which may be on separate chips); the GMCH 1090 includes memory and graphics controllers to which are coupled memory 1040 and a coprocessor 1045; the IOH 1050 is couples input/output (I/O) devices 1060 to the GMCH 1090. Alternatively, one or both of the memory and graphics controllers are integrated within the processor (as described herein), the memory 1040 and the coprocessor 1045 are coupled directly to the processor 1010, and the controller hub 1020 in a single chip with the IOH 1050.

The optional nature of additional processors 1015 is denoted in FIG. 10 with broken lines. Each processor 1010, 1015 may include one or more of the processing cores described herein and may be some version of the processor 900.

The memory 1040 may be, for example, dynamic random access memory (DRAM), phase change memory (PCM), or a combination of the two. For at least one embodiment, the controller hub 1020 communicates with the processor(s) 1010, 1015 via a multi-drop bus, such as a frontside bus (FSB), point-to-point interface such as QuickPath Interconnect (QPI), or similar connection 1095.

In one embodiment, the coprocessor 1045 is a special-purpose processor, such as, for example, a high-throughput MIC processor, a network or communication processor, compression engine, graphics processor, GPGPU, embedded processor, or the like. In one embodiment, controller hub 1020 may include an integrated graphics accelerator.

There can be a variety of differences between the physical resources 1010, 1015 in terms of a spectrum of metrics of merit including architectural, microarchitectural, thermal, power consumption characteristics, and the like.

In one embodiment, the processor 1010 executes instructions that control data processing operations of a general type. Embedded within the instructions may be coprocessor instructions. The processor 1010 recognizes these coprocessor instructions as being of a type that should be executed by the attached coprocessor 1045. Accordingly, the processor 1010 issues these coprocessor instructions (or control signals representing coprocessor instructions) on a coprocessor bus or other interconnect, to coprocessor 1045. Coprocessor(s) 1045 accept and execute the received coprocessor instructions.

Figure 11:
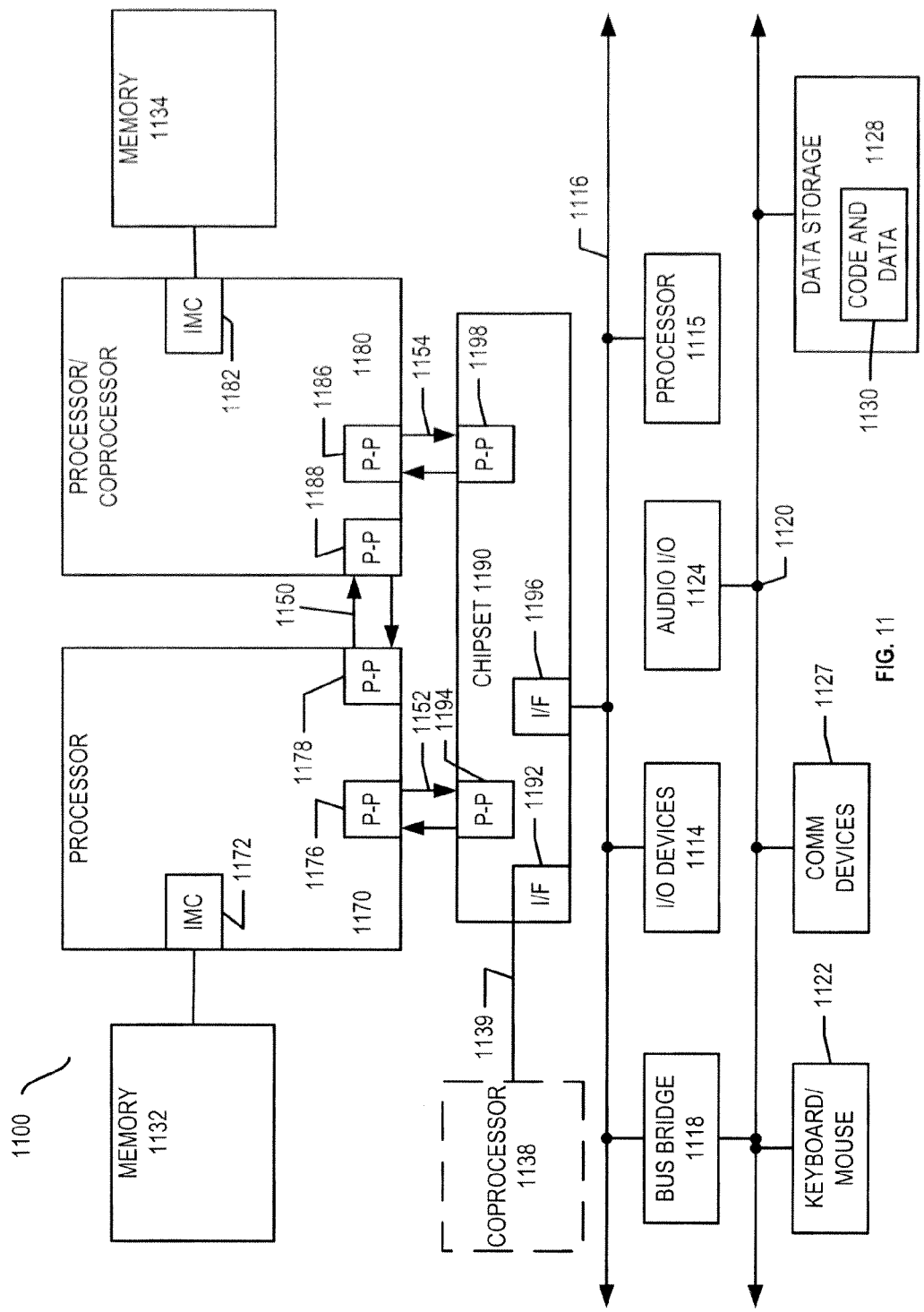
FIG. 11 shows a block diagram of a first more specific exemplary system in accordance with an embodiment of the present invention.

Referring now to FIG. 11, shown is a block diagram of a first more specific exemplary system 1100 in accordance with an embodiment of the present invention. As shown in FIG. 11, multiprocessor system 1100 is a point-to-point interconnect system, and includes a first processor 1170 and a second processor 1180 coupled via a point-to-point interconnect 1150. Each of processors 1170 and 1180 may be some version of the processor 900. In one embodiment of the invention, processors 1170 and 1180 are respectively processors 1010 and 1015, while coprocessor 1138 is coprocessor 1045. In another embodiment, processors 1170 and 1180 are respectively processor 1010 coprocessor 1045.

Processors 1170 and 1180 are shown including integrated memory controller (IMC) units 1172 and 1182, respectively. Processor 1170 also includes as part of its bus controller units point-to-point (P-P) interfaces 1176 and 1178; similarly, second processor 1180 includes P-P interfaces 1186 and 1188. Processors 1170, 1180 may exchange information via a point-to-point (P-P) interface 1150 using P-P interface circuits 1178, 1188. As shown in FIG. 11, IMCs 1172 and 1182 couple the processors to respective memories, namely a memory 1132 and a memory 1134, which may be portions of main memory locally attached to the respective processors.

Processors 1170, 1180 may each exchange information with a chipset 1190 via individual P-P interfaces 1152, 1154 using point to point interface circuits 1176, 1194, 1186, 1198. Chipset 1190 may optionally exchange information with the coprocessor 1138 via a high-performance interface 1139. In one embodiment, the coprocessor 1138 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1190 may be coupled to a first bus 1116 via an interface 1196. In one embodiment, first bus 1116 may be a Peripheral Component Interconnect (PCI) bus, or a bus such as a PCI Express bus or another third generation I/O interconnect bus, although the scope of the present invention is not so limited.

As shown in FIG. 11, various I/O devices 1114 may be coupled to first bus 1116, along with a bus bridge 1118 which couples first bus 1116 to a second bus 1120. In one embodiment, one or more additional processor(s) 1115, such as coprocessors, high-throughput MIC processors, GPGPU's, accelerators (such as, e.g., graphics accelerators or digital signal processing (DSP) units), field programmable gate arrays, or any other processor, are coupled to first bus 1116. In one embodiment, second bus 1120 may be a low pin count (LPC) bus. Various devices may be coupled to a second bus 1120 including, for example, a keyboard and/or mouse 1122, communication devices 1127 and a storage unit 1128 such as a disk drive or other mass storage device which may include instructions/code and data 1130, in one embodiment. Further, an audio I/O 1124 may be coupled to the second bus 1120. Note that other architectures are possible. For example, instead of the point-to-point architecture of FIG. 11, a system may implement a multi-drop bus or other such architecture.

Figure 12:
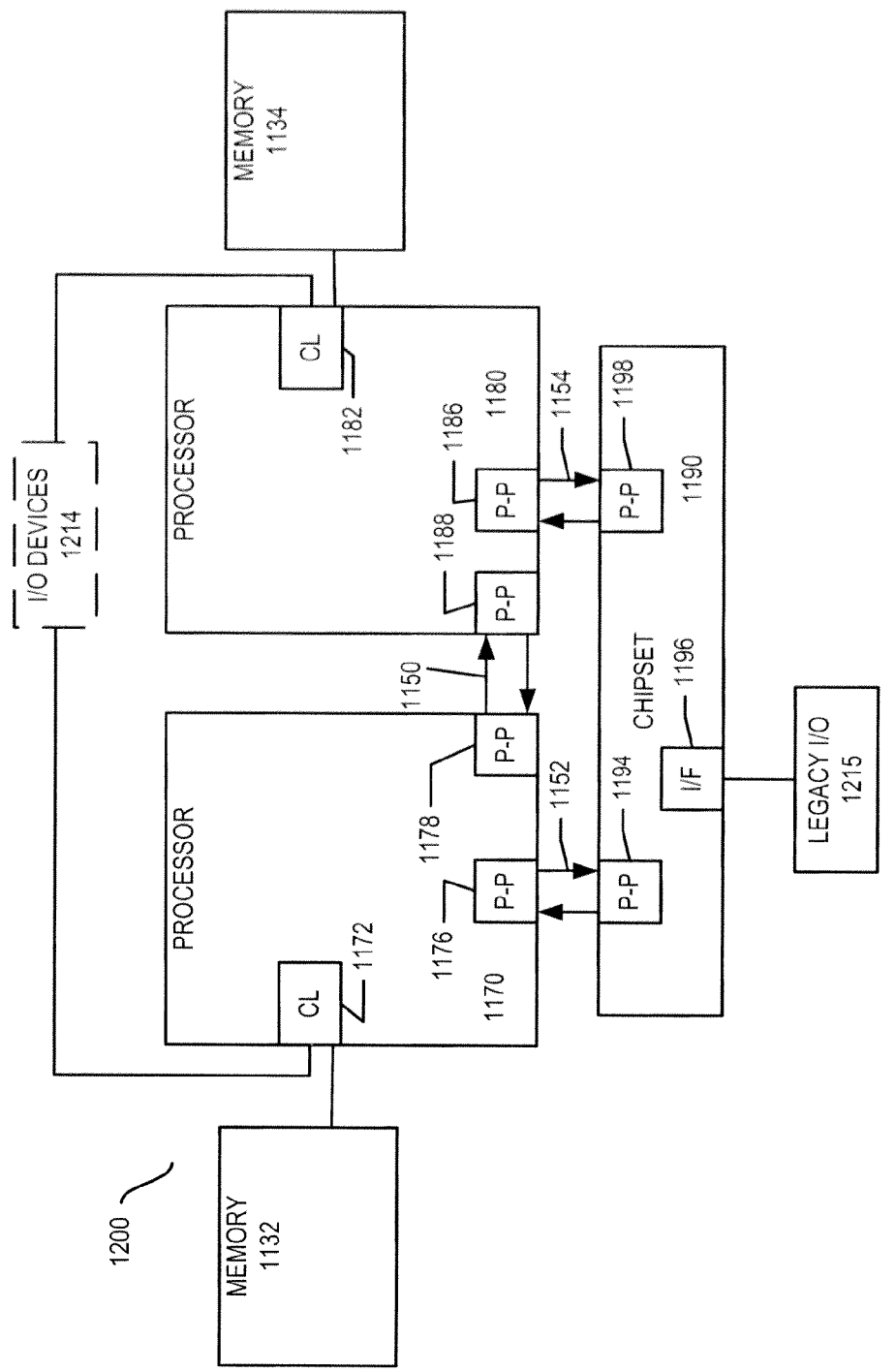
FIG. 12 shows a block diagram of a second more specific exemplary system in accordance with an embodiment of the present invention.

Referring now to FIG. 12, shown is a block diagram of a second more specific exemplary system 1200 in accordance with an embodiment of the present invention. Like elements in FIGS. 11 and 12 bear like reference numerals, and certain aspects of FIG. 11 have been omitted from FIG. 12 in order to avoid obscuring other aspects of FIG. 12.

FIG. 12 illustrates that the processors 1170, 1180 may include integrated memory and I/O control logic ("CL") 1172 and 1182, respectively. Thus, the CL 1172, 1182 include integrated memory controller units and include I/O control logic. FIG. 12 illustrates that not only are the memories 1132, 1134 coupled to the CL 1172, 1182, but also that I/O devices 1214 are also coupled to the control logic 1172, 1182. Legacy I/O devices 1215 are coupled to the chipset 1190.

Figure 13:
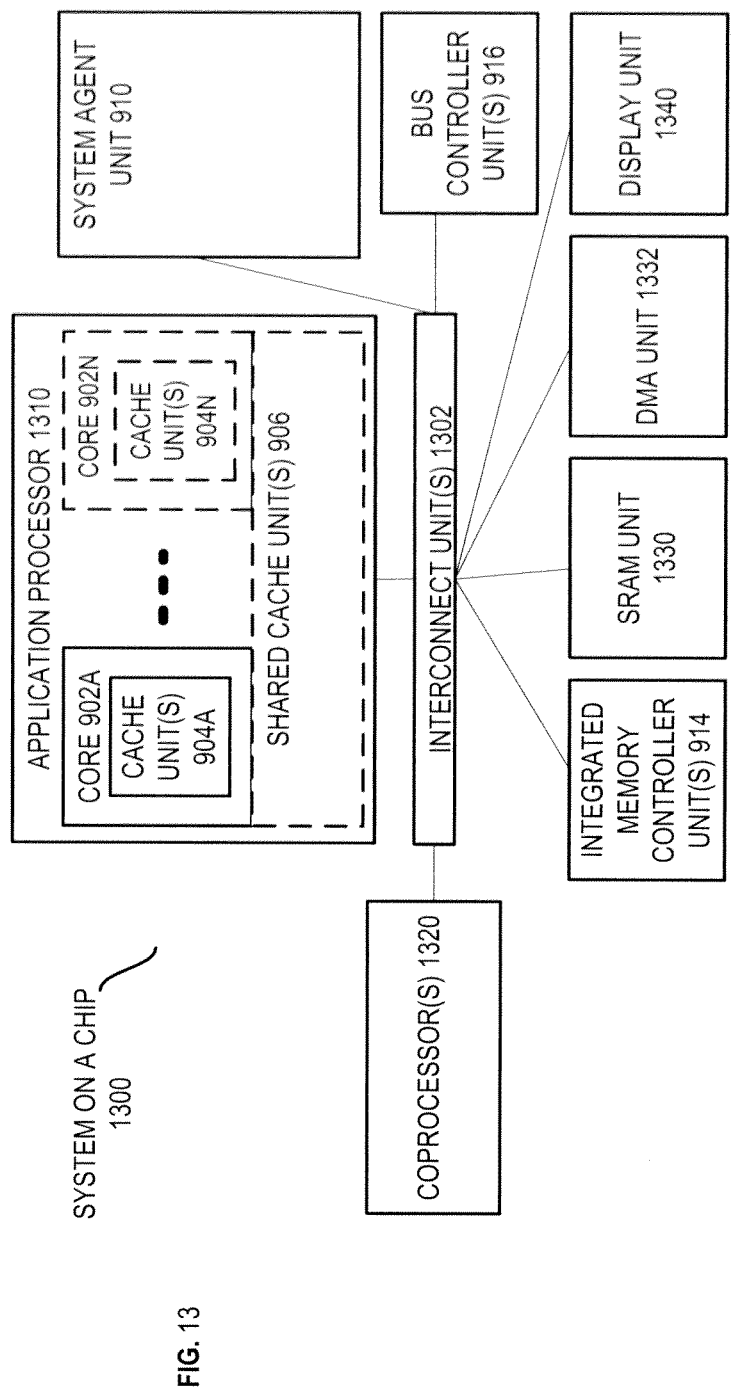
FIG. 13 shows a block diagram of a SoC in accordance with an embodiment of the present invention.

Referring now to FIG. 13, shown is a block diagram of a SoC 1300 in accordance with an embodiment of the present invention. Similar elements in FIG. 9 bear like reference numerals. Also, dashed lined boxes are optional features on more advanced SoCs. In FIG. 13, an interconnect unit(s) 1302 is coupled to: an application processor 1310 which includes a set of one or more cores 202A-N and shared cache unit(s) 906; a system agent unit 910; a bus controller unit(s) 916; an integrated memory controller unit(s) 914; a set or one or more coprocessors 1320 which may include integrated graphics logic, an image processor, an audio processor, and a video processor; an static random access memory (SRAM) unit 1330; a direct memory access (DMA) unit 1332; and a display unit 1340 for coupling to one or more external displays. In one embodiment, the coprocessor(s) 1320 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1130 illustrated in FIG. 11, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RW5), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphine, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 14 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 14 shows a program in a high level language 1402 may be compiled using an x86 compiler 1404 to generate x86 binary code 1406 that may be natively executed by a processor with at least one x86 instruction set core 1416. The processor with at least one x86 instruction set core 1416 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1404 represents a compiler that is operable to generate x86 binary code 1406 (e.g., object code) that can, with or without additional linkage processing, be executed on the processor with at least one x86 instruction set core 1416. Similarly, FIG. 14 shows the program in the high level language 1402 may be compiled using an alternative instruction set compiler 1408 to generate alternative instruction set binary code 1410 that may be natively executed by a processor without at least one x86 instruction set core 1414 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1412 is used to convert the x86 binary code 1406 into code that may be natively executed by the processor without an x86 instruction set core 1414. This converted code is not likely to be the same as the alternative instruction set binary code 1410 because an instruction converter capable of this is difficult to make; however, the converted code will accomplish the general operation and be made up of instructions from the alternative instruction set. Thus, the instruction converter 1412 represents software, firmware, hardware, or a combination thereof that, through emulation, simulation or any other process, allows a processor or other electronic device that does not have an x86 instruction set processor or core to execute the x86 binary code 1406.

It will be appreciated that, while exemplary embodiments have been described in reference to energy efficient and power conserving dynamic cache sizing and cache operating voltage management for optimal power performance, that various embodiments may be applied to different types of cache sizing and operating voltage management configurations and/or for different types of integrated circuits. Further, although power management control is accomplished using signal 144 for the exemplary embodiments described herein, other approaches to providing voltage control are within the scope of various embodiments. Although cache sizing control is accomplished using signals 146 and 154 for the exemplary embodiments described herein, other approaches to providing cache sizing control are within the scope of various embodiments. Finally, it can be appreciated that the concepts describe above can be applied to other designs of processors, cores, LLCs, etc, in addition to those shown herein.

Thus, various embodiments of a method and apparatus for energy efficient and power conserving thermal throttling of a processor using deep power down mode are described. In the foregoing specification, embodiments of the invention have been described with reference to specific exemplary embodiments thereof. It will, however, be appreciated that various modifications and changes may be made thereto without departing from the broader spirit and scope of embodiments of the invention as set forth in the appended claims. Thus, the specification and drawings are, accordingly, to be regarded in an illustrative rather than a restrictive sense.

What is claimed is:

1. A method comprising:
    monitoring, with a power control unit, a last level data cache (LLC) to identify a reduced amount of the LLC being used by a processor to process data, wherein the LLC is shared between at least two cores of the processor;
    reducing an amount of the LLC available for use by the processor cores, based on a cache size control signal generated by the power control unit;
    reducing an amount of power supplied to the LLC and to the processor, based on the reduced amount of the LLC being used.

2. The method of claim 1, further comprising:
    after reducing the amount of the LLC available and reducing the amount of power supplied to the LLC, monitoring the LLC to identify an increased amount of the LLC being used by the processor to process data and to identify smart cache expand heurestis;
    increasing an amount of the LLC available for use by the processor, based on the increased amount of the LLC being used;
    increasing an amount of power supplied to the LLC and to the processor, based on the increased amount of LLC being used.

3. The method of claim 2, wherein the reduced amount and the increased amount of the LLC being used are related to an operating system and an application running on the processor; and wherein the reduced amount and the increased amount of the LLC available for use by the processor are based on metrics, heuristics or factors calculated based on an amount of the LLC being used.

4. The method of claim 2, wherein the reduced amount and the increased amount of power supplied to the LLC and to the processor is based on the reduced amount and the increased amount of the LLC available for use by the processor.

5. The method of claim 2, wherein reducing the amount of the LLC available comprises removing the processor's ability to access a portion of the LLC, based on the reduced amount of the LLC being used; and wherein reducing the amount of power supplied to the LLC comprises removing power from a part of the LLC having a size less than the size of the portion of the LLC.

6. The method of claim 5, monitoring the LLC to identify the reduced amount and the increased amount of the LLC being used comprises periodically sniffing the cache; and wherein the portion of the LLC is selected to be in half megabyte increments.

7. The method of claim 1, further comprising, prior to monitoring, the processor processing data comprising data stored in the LLC.

8. The method of claim 1, further comprising:
using a first power supply to increase and decrease the amount of power and a frequency supplied to the LLC and to the processor; and
using a second power supply to supply a fixed amount of power and frequency to a Bus Interface Unit of the processor.

9. An apparatus comprising:
a processor having an execution unit including a first core and a second core;
a last level cache (LLC) shared by the first and second cores;
a power control unit (PCU) to reduce an amount of power supplied to the LLC and to the processor, based on a reduced amount of the LLC being used by the processor and to monitor the LLC to identify the reduced amount of the LLC being used by the processor to process data;
a finite state machine (FSM) the FSM to reduce an amount of the LLC available for use by the processor, based on a cache size control signal received from the PCU, the cache size control signal based on the reduced amount of the LLC being used.

10. The apparatus of claim 9, further comprising:
the PCU to, after reducing the amount of the LLC available and reducing the amount of power supplied to the LLC, monitor the LLC to identify an increased amount of the LLC being used by the processor to process data and to identify smart cache expand heurestis;
the FSM to increase an amount of the LLC available for use by the processor, based on the increased amount of the LLC being used;
the PCU to increase an amount of power supplied to the LLC and to the processor, based on the increased amount of the LLC being used.

11. The apparatus of claim 10 further comprising:
the PCU to reduce an amount and increase an amount of power supplied to the LLC and to the processor, based on the reduced amount and the increased amount of the LLC available for use by the processor.

12. The apparatus of claim 9 further comprising:
the PCU to periodically "sniffing" the cache to identify an amount of the LLC being used.

13. The apparatus of claim 9 further comprising:
the FSM to remove the processor's ability to access a portion of the LLC, based on the reduced amount of the LLC being used; and
the power control unit configured to remove power from a part of the LLC having a size less than the size of the portion of the LLC.

14. The apparatus of claim 9 further comprising:
the processor to process data comprising data stored in the LLC.

15. The apparatus of claim 9 further comprising:
the processor further comprising a Bus Interface Unit;
wherein the power control unit to use a first power supply to increase and decrease the amount of power and a frequency supplied to the LLC and to the processor, and to use a second power supply to supply a fixed amount of power and frequency to the Bus Interface Unit.

16. A system comprising:
a computing device having a processor and memory, the processor coupled to the memory to process data stored in the memory;
the processor having an execution unit including a first core and a second core that share a last level cache (LLC);
the execution unit coupled to a power control unit (PCU) and to a finite state machine (FSM), the FSM coupled to the power control unit;
monitor code of the power control unit to monitor the cache to identify a reduced amount of cache being used by the processor to process data;
the FSM to reduce an amount of cache available for use by the processor, based on a cache size control signal received from the power control unit, the cache size control signal based on the reduced amount of cache being used;
the power control unit to reduce an amount of power supplied to the cache and to the processor, based on the reduced amount of cache being used.

17. The system of claim 16, further comprising:
the monitor code to, after reducing the amount of cache available and reducing the amount of power supplied to the cache, monitor the cache to identify an increased amount of cache being used by the processor to process data and to identify smart cache expand heurestis;
the FSM to increase an amount of cache available for use by the processor, based on the increased amount of cache being used;
the PCU to increase an amount of power supplied to the cache and to the processor, based on the increased amount of cache being used.

18. The system of claim 17, further comprising:
the PCU to reduce an amount and increase an amount of power supplied to the cache and to the processor, based on the reduced amount and the increased amount of cache available for use by the processor; and wherein the reduced amount and the increased amount of the cache available for use by the processor are based on metrics, heuristics or factors calculated based on an amount of cache being used.

19. The system of claim 16, further comprising:
the FSM to remove the processor's ability to access a portion of the cache, based on the reduced amount of cache being used; and
the power control unit to remove power from a part of the cache having a size less than the size of the portion of the cache.

* * * * *